(12) United States Patent
Shapiro et al.

(10) Patent No.: US 11,227,585 B2
(45) Date of Patent: *Jan. 18, 2022

(54) INTENT RE-RANKER

(71) Applicant: AMAZON TECHNOLOGIES, INC., Seattle, WA (US)

(72) Inventors: Alexandra R. Shapiro, Palo Alto, CA (US); Melanie Chie Bomke Gens, Seattle, WA (US); Spyridon Matsoukas, Hopkinton, MA (US); Kellen Gillespie, Seattle, WA (US); Rahul Goel, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/815,188

(22) Filed: Mar. 11, 2020

(65) Prior Publication Data

US 2020/0279555 A1 Sep. 3, 2020

Related U.S. Application Data

(63) Continuation of application No. 15/463,339, filed on Mar. 20, 2017, now Pat. No. 10,600,406.

(51) Int. Cl.
*G10L 15/18* (2013.01)
*G10L 15/22* (2006.01)
*G10L 15/08* (2006.01)

(52) U.S. Cl.
CPC ......... *G10L 15/1815* (2013.01); *G10L 15/22* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| 6,098,043 | A  | * | 8/2000 | Forest  | G10L 15/26 |
| | | | | | 379/88.01 |
| 6,418,216 | B1 | * | 7/2002 | Harrison | H04M 3/20 |
| | | | | | 379/205.01 |
| 7,930,183 | B2 | * | 4/2011 | Odell  | G10L 15/26 |
| | | | | | 704/275 |

(Continued)

*Primary Examiner* — Neeraj Sharma
(74) *Attorney, Agent, or Firm* — Pierce Atwood LLP

(57) ABSTRACT

Methods and systems for determining an intent of an utterance using contextual information associated with a requesting device are described herein. Voice activated electronic devices may, in some embodiments, be capable of displaying content using a display screen. Entity data representing the content rendered by the display screen may describe entities having similar attributes as an identified intent from natural language understanding processing. Natural language understanding processing may attempt to resolve one or more declared slots for a particular intent and may generate an initial list of intent hypotheses ranked to indicate which are most likely to correspond to the utterance. The entity data may be compared with the declared slots for the intent hypotheses, and the list of intent hypothesis may be re-ranked to account for matching slots from the contextual metadata. The top ranked intent hypothesis after re-ranking may then be selected as the utterance's intent.

19 Claims, 6 Drawing Sheets

(56) References Cited

U.S. PATENT DOCUMENTS

| | | | |
|---|---|---|---|
| 2003/0167166 A1* | 9/2003 | Mann | G10L 15/22 704/231 |
| 2008/0130528 A1* | 6/2008 | Ennai | H04L 65/4061 370/293 |
| 2017/0357650 A1* | 12/2017 | de Almeida Forjaz de Lacerda | G06F 16/9566 |
| 2018/0114190 A1* | 4/2018 | Borrel | G06N 20/00 |
| 2018/0225568 A1* | 8/2018 | Chandramouli | G06F 40/216 |

* cited by examiner

INTENT RE-RANKER

CROSS-REFERENCE TO RELATED APPLICATION

This application is a continuation of, and claims the benefit of priority of, U.S. Non-provisional patent application Ser. No. 15/463,339, filed on Mar. 20, 2017, and entitled "INTENT RE-RANKER," which is scheduled to issue as U.S. Pat. No. 10,600,406, the contents of which is expressly incorporated herein by reference in its entirety.

BACKGROUND

Electronic devices, such as voice activated electronic devices, are capable of performing various functions. For instance, an individual may speak a command to activate such a device and in response, the device may perform various functions and/or cause one or more actions to be performed. Some voice activated electronic device may also include display screens capable of outputting content.

DETAILED DESCRIPTION

Figure 1:
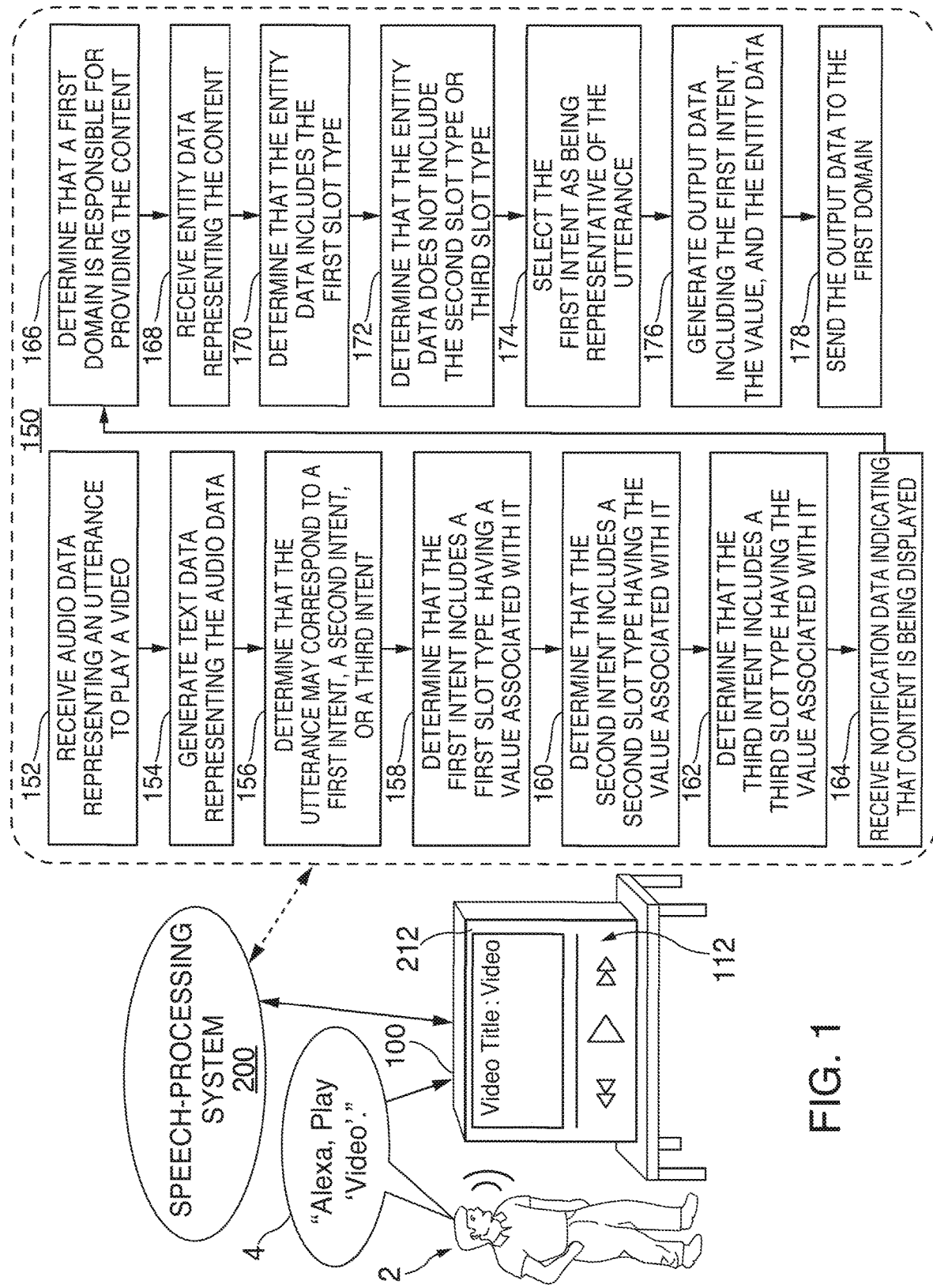
FIG. 1 is an illustrative diagram of an exemplary system for determining an intent of an utterance using entity data associated with displayed content, in accordance with various embodiments.

The present disclosure, as set forth below, is generally directed to various embodiments of methods and systems for performing intent re-ranking based on features associated with an electronic device. In particular, domain re-ranking may be performed to re-weight intent specific hypotheses associated with an utterance based on content currently being displayed by a display screen associated with the electronic device.

When an individual speaks an utterance to their voice activated electronic device, audio input components may receive the audio signals, and may generate and send audio data representing the utterance to a speech-processing system. The speech-processing system may be configured to perform speech processing to the audio data in order to determine what the individual said, and to cause one or more actions to be performed in response. For example, an individual may speak an utterance requesting a current weather forecast. In this example, the speech-processing system may determine that the utterance is for a weather forecast, retrieve weather information associated with the individual's current location, and may output content (e.g., audio content, video content) indicating the weather forecast for that location.

When audio data representing an utterance is received by the speech-processing system, automatic speech recognition ("ASR") processing may be performed to generate text data that represents the audio data. Natural language understanding ("NLU") processing may then be performed to determine an intent of the utterance using the text data. NLU processing may generate a list of intent hypotheses for the utterance, where each intent hypotheses has a confidence score associated with it indicating a likelihood that the particular intent hypothesis is the utterance's intent. The list of intent hypotheses may be ranked from most likely to represent the utterance's intent to least likely to represent the utterance's intent, where the ranking is based on the intent hypotheses' feature/confidence scores.

For multi-modal devices, however, this process may be enhanced by using additional features associated with the device, such as whether the device includes a display screen and/or whether content is being displayed by a display screen associated with the device, to refine the ranking of the intent hypotheses. For instance, if there is content being displayed by the display screen, the spoken utterance may be referring to that content. Therefore, NLU processing may be configured to re-rank the list of intent hypotheses based on the text data representative of the utterance, as well as based on the content.

Different utterances may be associated with different intents. Initially, NLU processing may, for instance, attempt to determine what possible intents the utterance may correspond to, and thus what action(s) the individual is requesting to occur. Furthermore, different utterances may be associated with different entities (e.g., persons, places, objects, etc.) related to the intent. Therefore, for some embodiments of the speech-processing system to properly execute the action desired by the individual, the speech-processing system will need to identify the intent of the utterance, and the entities associated with the utterance. For example, an utterance of "Play 'Song 1'" may correspond to a "play music" intent, where a music player is to play music corresponding to a song titled "Song 1." To identify an intent of an utterance, a process referred to as intent classification may be performed. The process of identifying an entity may involve entity recognition and entity resolution. Here, an identification of an entity within text data, and matching the text data of the entity to a specific entity known to the speech-processing system, may occur, respectively. The result of this initial NLU processing may be the ranked list of intent hypotheses, which may indicate intent hypotheses ordered from most likely to correspond to the utterance to least likely to correspond to the utterance based on the text data representing an utterance.

In some embodiments, two or more intent hypotheses may be ranked as being equally likely to correspond to the utterance. In this particular scenario, the speech-processing system may need additional information to resolve the intent and/or entities. This may encompass the speech-processing system prompting a follow-up question, requesting that the utterance be repeated, and/or prompting an error message.

In some embodiments, content being displayed by a display screen associated with the electronic device may be used to assist in identifying the intent of the utterance. More generally, the electronic device may be rendering content in the foreground (e.g., on screen) or background (e.g., audio playing while other functions are in use by the device). Thus, a domain currently responsible for rendering the content, whether foreground content and/or background content, may provide contextual information to assist in re-ranking the intent hypotheses. To do this, in response to receiving the audio data, some embodiments of the speech-processing system may also receive notification data indicating that content is being displayed, or was displayed, by a display screen associated with the electronic device. In some embodiments, an orchestrator component of the speech-processing system may send a request to a multi-domain functionality system that inquires as to which domain is currently responsible for providing the displayed content to the electronic device. After determining the domain, the orchestrator may receive or otherwise cause the natural language understanding system to receive entity data representing the content.

Upon receiving entity data representing the content from the domain responsible for the content, a feature extraction process may be performed to the entity data to identify entities associated with the rendered content. For example, if the content includes a list of songs to be played, the extracted features may correspond to one or more slot types, such as song title slots, artist name slots, genre slots, and the like. Using these features, NLU processing may revise the list of intent hypotheses to account for the presence, or absence, of those features from each intent hypotheses. For instance, updated feature scores may be generated for each intent hypothesis based on the previously obtained feature information and the newly determined feature information. NLU processing may then re-rank the intent hypotheses based on the revised feature scores, and the re-ranked listing may be used to determine the intent hypothesis that most likely corresponds to the utterance's desired intent. After the intent hypothesis is selected, output data may be generated that includes the selected intent hypothesis, entities resolved via entity resolution processing, as well as the entity data. The output data may then be provided to the domain associated with the selected intent hypothesis to facilitate for additional processing associated with that domain (e.g., causing one or more actions to be performed).

The natural language understanding system may, in some embodiments, determine a likely intent, or intents, that the utterance may correspond to using on one or more language models associated with various domains accessible by the speech-processing system. Different intents may be associated with different domains, or topical categories. A domain, in one embodiment, may represent a certain subject area for the speech-processing system, and may be configured with intents, slot structures, and the like, associated with that subject area. Various functionalities may be associated with various domains such that an intent that is determined to be associated with one domain may lead the system to contract a particular functionality to facilitate an action associated with an utterance's intent. For example, a request to play a song may be associated with a music domain, and the speech-processing system may facilitate the request using a music player functionality associated with the music domain. Each intent may include one or more slot types corresponding to one or more slots. Slots, as described herein, may also be referred to as slot data, fillable slots, declared slots, placeholders, and/or fields, which may have a corresponding value associated with them. For example, if an individual says, "Alexa, buy this," the intent of this utterance may be related to a shopping domain where the intent may be for purchasing an item. The "purchasing an item" intent may include one or more slot types corresponding to various slot data that may be resolved based, in one embodiment, on text data representing an utterance, as well as entity data requested by the orchestrator. Using the text data and slot type, the natural language understanding system may be capable of determining values associated with one or more different types of slot data, and may also be capable of "filling-in" the one or more slots with their associated value, such that the slot data represents the "filled-in" value. As an illustrative example, for the utterance, "Add this to my cart," the word "this" may be resolved as a value for an "Anaphoric Term" slot, and the output from the natural language understanding system may include "Anaphoric" slot data representing the value.

In some embodiments, an electronic device, such as those described previously, may be a sound controlled electronic device. A sound controlled electronic device, as described herein, may correspond to any device capable of being activated in response to detection of a specific word (e.g., a word, a phoneme, a phrase or grouping of words, or any other type of sound, or any series of temporally related sounds). For example, a voice activated electronic device is one type of sound controlled electronic device. In response to determining that a wakeword has been uttered, the voice activated electronic device may, in some embodiments, send the audio data representing a spoken utterance subsequently following the wakeword to a speech-processing system for processing and analyzing the audio data. The speech-processing system may then generate and send a response to the voice activated electronic device, as well as, or alternatively, communicate with one or more additional systems for obtaining content to be rendered by the voice activated electronic device, and/or may cause one or more additional electronic devices to output content and/or perform a particular action (e.g., turn on a light, preheat an oven, etc.). Additionally, the voice activated electronic device may store one or more wakewords within its local memory. If a determination is made that audio data received from the audio input devices (e.g., microphones) matches the wakeword, the voice activated electronic device may begin sending audio data representing some or all of the audio captured by the voice activated electronic device to the speech-processing system.

Spoken voice commands, in some embodiments, may be prefaced by a wakeword, which may also be referred to as a trigger expression, wake expression, or activation word. In response to detecting the wakeword being uttered, a voice activated electronic device may be configured to detect and interpret any words that subsequently follow the detected wakeword as actionable inputs or commands. In some embodiments, the voice activated electronic device may be activated by a phrase or grouping of words, which the voice activated device may also be configured to detect. The voice activated device, therefore, may also be able to detect and interpret any words subsequently following that phrase or grouping of words.

As used herein, the term "wakeword" may correspond to a "keyword" or "key phrase," an "activation word" or "activation words," or a "trigger," "trigger word," or "trigger expression." One exemplary wakeword may be a name, such as the name, "Alexa," however persons of ordinary skill in the art will recognize that the any word (e.g., "Amazon"), or series of words (e.g., "Wake Up" or "Hello, Alexa") may alternatively be used as the wakeword. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger that is used to activate a voice activated device may be any series of temporally related sounds.

As used herein, the term "utterance" may correspond to a spoken word, statement, or sound. In some embodiments, an utterance may include the wakeword followed by an invocation, such as a request, question, or command. In this particular instance, the utterance may begin with the wakeword being spoken, and may end when a last word, phoneme, or sound is spoken. For example, an utterance may correspond to the question, "Alexa—What is the weather currently like?" As another example, an utterance may be, "Alexa—Play my workout music," or "Alexa—Buy that." Further still, an utterance, which need not include the wakeword, may be, "Turn up the volume" or "Call mom."

Another type of sound controlled electronic device may be a sound activated electronic device. Such sound activated electronic device may function similarly to voice activated electronic devices, except that, for sound activated electronic devices, the trigger may be a non-verbal sound. For example, the sound of a door opening, an alarm going off, glass breaking, a telephone ringing, or any other sound may alternatively be used to activate a sound controlled electronic device. In this particular scenario, detection of a non-verbal sound may occur in a substantially similar manner as that of a verbal wakeword for a voice activated electronic device. For example, the sound of a door opening, when detected, may activate a sound activated electronic device, which in turn may activate a burglar alarm.

In some embodiments, the electronic device may additionally, or alternatively, correspond to a manually activated electronic device. A manually activated electronic device, as described herein, may correspond to a device that is capable of being activated in response to a manual input from an individual (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed by an individual. In some embodiments, a sound controlled electronic device (e.g., a voice activated electronic device and/or a sound activated electronic device) may include manual activated functionality such that an individual may interact with the device using voice (e.g., speech prefaced by a wakeword), sound (e.g., a particular trigger sound), and/or a manual input (e.g., a button press, a touch of a screen, etc.). However, in some embodiments, an electronic device may be configured to include a single activation functionality (e.g., only voice activated, or only manually activated).

FIG. 1 is an illustrative diagram of an exemplary system for determining an intent of an utterance using entity data associated with displayed content, in accordance with various embodiments. In the illustrative, non-limiting embodiment, an individual 2 may speak an utterance 4, "Alexa, Play 'Video 1'," to their voice activated electronic device 100. In this particular scenario, individual 2 may be capable of watching a video on display screen 212 of voice activated electronic device 100. For instance, a graphical user interface ("GUI") 112 may be displayed by display screen 212, where GUI 112 includes a video that may be rendered. In order to play the video, individual 2 may need to speak a particular utterance that requests that the content indicated by GUI 112 be output. However, speech-processing system 200 may be unable to determine what specific item it is that individual 2 seeks to be played based on the spoken words of utterance 4.

In some embodiments, speech-processing system 200 may perform exemplary process 150. Process 150, in one embodiment, may begin at step 152. At step 152, audio data representing an utterance to play a video may be received. As seen in FIG. 1, individual 2 may speak utterance 4, "Alexa, Play 'Video'." Utterance 4, for instance, may include a wakeword (e.g., "Alexa") that is subsequently followed by a request to play a video (e.g., "play 'Video'"). For instance, the utterance may include a verb (e.g., "play") and an object (e.g., "Video"). Upon determining that the wakeword has been uttered, voice activated electronic device 100 may begin packaging and sending audio data representing utterance 4 to speech-processing system 200. The audio data, when received by speech-processing system 200, may be provided to one or more speech processing components to determine an intent of the utterance, as well as cause one or more actions to be performed.

At step 154, text data representing the audio data may be generated by speech-processing system 200. In some embodiments, an orchestrator component of speech-processing system 200 may cause the audio data, upon receipt, to be provided to an automatic speech recognition ("ASR") system to perform automatic speech recognition processing. The ASR system may be configured to perform speech-to-text processing to generate text of each word, sub-word unit, and/or phoneme, included within utterance 4. In some embodiments, the text data may include a first text portion representing the verb (e.g., "play") and a second text portion representing the object (e.g., "video"). After generating the text data, the orchestrator component may provide the text data to a natural language understanding ("NLU") system to perform natural language understanding processing to the text data.

At step 156, the NLU processing may determine that utterance 4 may correspond to a first intent associated with a first functionality, a second intent associated with a second functionality, or a third intent associated with a third functionality. For example, utterance 4 may correspond to a "Play Video" intent, a "Play Music" intent, or a "Play E-Book" intent (e.g., an audio book). The NLU system may parse the text data to identify spoken words as subject, object, verb, preposition, etc., based on grammar rules and/or models. Using the identified verb, an intent of utterance 4 be determined. Different domains, or categorical subjects corresponding to one or more functionalities, may be associated with one or more intent specific words. For example, the NLU processing may determine that the first text portion, corresponding to the verb "play," may be associated with a video domain, a music domain, and an e-book domain. Therefore, in this particular example, each of the "Play Video" intent, "Play Music" intent, and "Play E-Book" intent may be possible intents that utterance 4 is associated with. Persons of ordinary skill in the art will recognize that one or more of the first intent, the second intent, and/or the third intent may be associated with a same functionality, and the aforementioned is merely exemplary.

Each intent may have a confidence/feature score associated with it, where the confidence score indicates a likelihood that the particular intent is the intent that the utterance corresponds to. The various intents that are identified, at this stage may be referred to as "intent hypotheses," reflecting that they are hypotheses of the utterance's intent. In some embodiments, however, two or more intents may have a same, or substantially same, confidence/feature score. Therefore, NLU processing, in this particular scenario, may determine initially that the utterance may correspond to the first intent, second intent, or third intent, and thus may be unable to resolve the intent. Thus, in the illustrative example, the scores associated with the "Play Video" intent, "Play Music" intent, and "Play E-Book" intent may all be substantially equal (and greater than any other intent that utterance 4 may be associated with).

At step 158, the first intent may be determined to include first slot data representing a first slot of a first slot type, where a first value may be associated with the first slot data. Each domain, as mentioned above, may include various intents, and each intent may also specify a list of slots/fields/placeholders that are applicable to play an identified object of the utterance. For example, utterance 4 may be parsed into the grammatical objects {Verb}: "Play," and {Object}: "Video." Therefore, the object, "Video," from utterance 4 may be associated with different types of slot data depending on the identified intents associated with utterance 4. In one embodiment, the first intent may include one or more slots, such as first slot data representing a first slot being of a first slot type. For example, the "Play Video" intent may include "Video Title" slot data, corresponding to a "Video Title" slot. Each slot may be attributed a value based on the parsed text of the utterance. Therefore, in this particular embodiment, the object "Video," or the attributable value, may be identified as being associated with the first slot data (e.g., {Video Title}: "Video 1").

At step 160, a determination may be made that the second intent includes second slot data representing a second slot being of a second slot type, where the first value may be associated with the second slot data. For example, the "Play Music" intent may include "Song Title" slot data representing a "Song Title" slot, and the object "Video" may be attributed to the "Song Title" slot data. Furthermore, at step 162, a determination may be made that the third intent includes third slot data representing a third slot being of a third slot type, where the first value may be associated with the third slot data. For example, the "Play E-Book" intent may include "Book Title" slot data, and the object "Video" may be attributed to the "Book Title" slot data. Persons of ordinary skill in the art will recognize that although a same "value" is associated with each of the first slot, second slot, and third slot, this is merely exemplary. For example, a different value may be associated with different slots corresponding to different intents.

At step 164, notification data may be received by speech-processing system 200 that indicates that content is currently being displayed by a display screen associated with electronic device 100. For instance, during a period of time when individual 2 spoke utterance 4, display screen 212 may display GUI 112. Persons of ordinary skill in the art will recognize that electronic device 100 need not include the display screen, and electronic device 100 may be in communication with a display screen such that content may be rendered by the display screen via electronic device 100 (e.g., a set top box coupled to a television or other display). In some embodiments, in response to determining that a wakeword for voice activated electronic device 100 (e.g., "Alexa") was uttered, a determination may be made by voice activated electronic device 100 as to whether or not it is currently rendering content thereon. For example, voice activated electronic device 100 may determine whether content (e.g., display data representing GUI 112) is being received, or has been received, which is currently being displayed by display screen 212. If so, then electronic device 100 may provide notification data to speech-processing system 200 indicating that content is being displayed. If not, then electronic device 100 may provide notification data to speech-processing system 200 indicating that content is not being displayed, or electronic device 100 may, alternatively, not provide any notification. The notification may be a logical 1/0 indicator representative of electronic device 100 displaying content, or not displaying content, for example. Persons of ordinary skill in the art will recognize that, in some embodiments, the notification may be sent in response to a manual activation of electronic device 100 (e.g., pressing a button, touching a touch screen, etc.), or in response to any other suitable type of activation for electronic device 100, and the utterance of a wakeword causing the notification to be sent to speech-processing system 200 is merely exemplary. Furthermore, in some embodiments, the notification may be included within metadata sent with the audio data.

At step 166, a first domain may be determined to be responsible for providing the content. For example, a video domain may be determined to be responsible for providing GUI 112 to electronic device 100. In some embodiments, the notification data may be received by the orchestrator component of speech-processing system 200. The orchestrator component may be configured to query the domains associated with speech-processing system 200 to determine which domain is currently providing the content being rendered by voice activated electronic device 100. In the illustrative embodiment, GUI 112 may include a video capable of being played by electronic device 100, and therefore a video domain may be the domain providing display data representing GUI 112. Therefore, the orchestrator component may request that the video domain provide the NLU system with information associated with the currently rendered content. However, in other embodiments, the orchestrator component, or the NLU system, may monitor which domain(s) are providing electronic device 100 with content, and therefore a request/determination may not be required.

At step 168, entity data representing the content may be received by the NLU system from the video domain. The entity data may include information, such as various types of slot data, associated with what is being displayed, as well as values associated with the slot data. As an illustrative example, the video domain may be responsible for providing display data representing GUI 112, which includes a video having a video title being "Video 1." Therefore, the entity data may include "Video Title" slot data representing a slot value being "Video 1." If a video genre is also available, then a video genre may also be included within the entity data. In some embodiments, each domain may be configured to format its entity data such that it includes the same, or substantially the same, types of slot data as the NLU system includes for a particular intent associated with that same domain. So, for instance, if the "Play Video" intent includes video title slot data, then content provided by the video domain may also include, if available, video title slot data representing a value attributed to the video title slot based on the video being provided (e.g., "Video").

At step 170, a determination may be made that the entity data includes the first slot data. For example, the entity data may indicate that GUI 112 includes "Video Title" slot data. In some embodiments, a value associated with the contextual slot data identified from the entity data may also be determined. For example, the NLU system may also determine that the "Video Title" slot data, obtained from the entity data, has a value "Video" associated with it. At step 172, a determination may be made that the entity data does not include the second slot data representing a second slot of the second slot type or the third slot data representing a third slot of the third slot type. For example, the entity data may include "Video Title" slot data, corresponding to the video title "Video" of a video available for being output by display screen 212, however the entity data may lack the "Song Title" slot data and the "Book Title" slot data. Persons of ordinary skill in the art will recognize that in some embodiments, step 172 may be optional.

At step 174, the first intent may be selected as being representative of the utterance. For example, the "Play Video" intent may be determined to be representative of utterance 4. A score (e.g., a feature score) for the first intent may be recalculated to include the information that the content being displayed includes the first slot data (e.g., a slot of the first slot type), as well as lacks the second slot data and the third slot data (e.g., slots of the second slot type and third slot type). The fact that the entity data includes the first slot data may cause a score associated with the first intent to increase, as the first intent may now have another value to use when its feature score is being calculated. For example, if a feature score previously calculated for the "Play Video" intent using the text data is X, then the recalculated feature score may be X+s, where "s" encapsulated the additional positive feature value attributed to the entity data and the first intent both including the first slot data. Therefore, because the second intent and the third intent do not include the first slot data, the scores associated with these two intents may remain the same or decrease. Generally speaking, the lack of an intent hypothesis having a feature (e.g., slot data of a particular slot type) included within entity data for a device may result in a re-calculated feature score for that intent hypothesis not increasing. The result may be that the feature score for the first intent is greater than the feature score for the second intent and the third intent intents, indicating that the first intent is the most likely intent representation of the utterance. For example, the feature score associated with the "Play Video" intent may be greater than the feature scores for the "Play Music" intent and the "Play E-Book" intent, indicating that the "Play Video" intent is the most likely intent representation associated with utterance 4.

At step 176, output data including the first intent, the value, as well as the entity data, may be generated. For instance, the output data may include the "Play Video" intent (e.g., {Intent}: "Play Video"), the value "Video" attributed to the "Video Title" slot data from the text data (e.g., {Video Title}: "Video 1"), and the entity data (e.g., entity data representing content including GUI 112). At step 178, the output data may be sent to the first domain. For example, because the "Play Video" intent was determined to have the highest/greatest feature score, and therefore is the most likely intent associated with utterance 4, the domain associated with the "Play Video" intent (e.g., the video domain) may be provided with the output data from the NLU system such that the action of playing a video may occur.

Figure 2A:
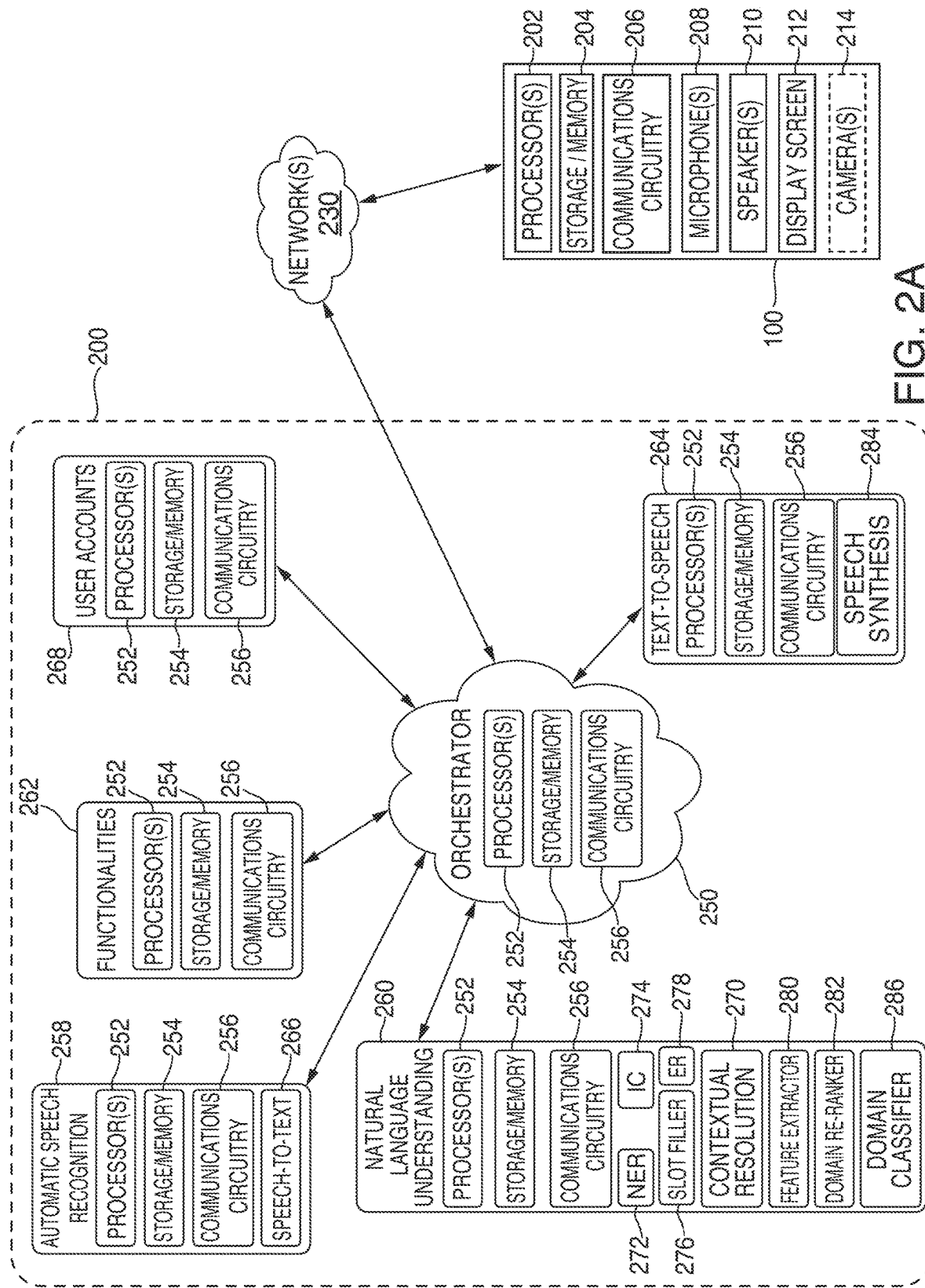
FIG. 2A is an illustrative diagram of the system architecture of FIG. 1, in accordance with various embodiments.

FIG. 2A is an illustrative diagram of the system architecture of FIG. 1, in accordance with various embodiments. Electronic device 100 may, in some embodiments, include sound controlled functionality, such as one or more voice and/or sound activated components. In some embodiments, electronic device 100 may be configured to communicate with speech-processing system 200 in response to detecting an utterance including a wakeword, which may subsequently be followed by a request/question/statement. Similarly, electronic device 100 may alternatively or additionally include one or more manually activated components for manually activating electronic device 100. In this particular scenario, electronic device 100 may also be configured, in one embodiment, to communicate with speech-processing system 200 in response to a manual input being detected by one or more input mechanisms, such as a touch screen, a button, and/or a switch, for example.

In a non-limiting embodiment, electronic device 100 may be capable of being activated in response to detecting a specific sound, such as a wakeword, as well as, or alternatively, via one or more inputs. After detecting a specific sound (e.g., a wakeword or trigger expression), electronic device 100 may recognize commands (e.g., audible commands, inputs) within captured audio, and may perform one or more actions in response to the received commands. Furthermore, electronic device 100 may also be configured to perform one or more actions in response to detecting a particular touch, or mechanical, input(s) via electronic device 100.

Electronic device 100 may correspond to any suitable type of electronic device including, but are not limited to, desktop computers, mobile computers (e.g., laptops, ultrabooks), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., boats, ships, trains, airplanes, etc.), wearable devices (e.g., watches, pins/broaches, headphones, etc.), and/or smart accessories (e.g., light bulbs, light switches, electrical switches, etc.). In some embodiments, electronic device 100 may be relatively simple or basic in structure such that no, or a minimal number of, mechanical input option(s) (e.g., keyboard, mouse, track pad) or touch input(s) (e.g., touch screen, buttons) are included. For example, electronic device 100 may be able to receive and output audio, and may include power, processing capabilities, storage/memory capabilities, and communication capabilities. However, in other embodiments, electronic device 100 may include one or more components for receiving mechanical inputs or touch inputs, such as a touch screen and/or one or more buttons.

Electronic device 100, in one embodiment, may include a minimal number of input mechanisms (e.g., a power on/off switch) such that functionality of electronic device 100 may solely or primarily be through audio input and audio output. For example, electronic device 100 may include, or be in communication with, one or more microphones that listen for a wakeword by continually monitoring local audio. In response to the wakeword being detected, electronic device 100 may establish a connection with speech-processing system 200, send audio data to speech-processing system 200, and await/receive a response from speech-processing system 200. In some embodiments, however, non-voice/sound activated devices may also communicate with speech-processing system 200. For example, in response to a button or touch screen being pressed, or a button or touch screen being pressed and held, a microphone associated with electronic device 100 may begin recording local audio, establish a connection with speech-processing system 200, send audio data representing the captured audio to speech-processing system 200, and await/receive a response, and/or action to be occur, from speech-processing system 200.

Persons of ordinary skill in the art will recognize that speech-processing system 200 may be located within a dedicated computing device or computing system, which may or may not be in communication with one or more additional devices. For instance, speech-processing system 200 may be located on a remote computing system with which an individual subscribes to a service on. However, speech-processing system 200 may also be included within a computing system locally stored or owned by an individual.

Electronic device 100 may include one or more processors 202, storage/memory 204, communications circuitry 206, one or more microphones 208 or other audio input devices (e.g., transducers), one or more speakers 210 or other audio output devices, a display screen 212, and one or more cameras 214 or other image capturing components. However, one or more additional components may be included within electronic device 100, and/or one or more components may be omitted. For example, electronic device 100 may also include a power supply or a bus connector. As still yet another example, electronic device 100 may include one or more additional input and/or output mechanisms, such as one or more buttons, or one or more switches or knobs. Furthermore, while electronic device 100 may include multiple instances of one or more components, for simplicity only one of each component has been shown.

In some embodiments, electronic device 100 may correspond to a manually activated device, or may include the functionality of a manually activated device. A manually activated device, as described herein, may correspond to a device that is capable of being activated in response to a manual input (e.g., pressing a button, touching a portion of a touch screen, turning a knob, performing an action on a device). For example, a tap-to-talk device is one type of manually activated device. Such tap-to-talk devices, for instance, are capable of obtaining and outputting audio data in response to a button being pressed.

In one embodiment, electronic device 100 may be in communication with an additional processing device including one or more of: processor(s) 202, storage/memory 204, communications circuitry 206, microphone(s) 208, speaker(s) 210, display screen 212, and/or camera(s) 214. For example, a centralized control device of electronic device 100 may include one or more microphone(s) 208. These microphone(s) 208 may receive audio input signals, and electronic device may determine whether or not the audio input signals indicate that a wakeword was uttered. If so, then electronic device may cause audio data representing an utterance including the wakeword, or spoken after the wakeword to be sent to speech-processing system 200.

Processor(s) 202 may include any suitable processing circuitry capable of controlling operations and functionality of electronic device 100, as well as facilitating communications between various components within electronic device 100. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program systems, program data, and/or one or more operating systems. However, processor(s) 202 may run an operating system ("OS") for electronic device 100, and/or one or more firmware applications, media applications, and/or applications resident thereon. In some embodiments, processor(s) 202 may run a local client script for reading and rendering content received from one or more websites. For example, processor(s) 202 may run a local JavaScript client for rendering HTML or XHTML content received from a particular URL accessed by electronic device 100.

Storage/memory 204 may include one or more types of storage mediums such as any volatile or non-volatile memory, or any removable or non-removable memory implemented in any suitable manner to store data for electronic device 100. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include a media system, which may be configured to facilitate communications between electronic devices 100 and speech-processing system 200. For example, the media system may store one or more communications protocols that may be executed by processor(s) 202 for facilitating communications for device 100. In some embodiments, a sessions initiation protocol ("SIP") may be used to facilitate media transfer between electronic device 100 and one or more of speech-processing system 200 and another electronic device 100. SIP, for example, is an application layer protocol that is text based, and may employ Real-time Transport Protocol ("RTP") or Secure Real-time Transport Protocol ("SRTP") functions. In particular, PJSIP communications functionality may be employed to support audio, video, presence, and messaging communications for electronic device 100. In some embodiments, a Web Real-Time Communications ("WebRTC") protocols may be employed by electronic device 100. In a non-limiting embodiment, the media system may include instructions that indicate which communications protocols to employ for facilitating media transfer between devices based on a device type of electronic device 100. For example, if electronic device 100 does not include display 212 and/or camera 214, then the media system may indicate that PJSIP should be used, whereas if electronic device 100 includes display 212 and/or camera 214 then the media system may indicate that WebRTC protocols should be used.

In some embodiments, storage/memory 204 may include one or more systems and/or databases, such as a speech recognition system, a wakeword database, a sound profile database, and a wakeword detection system. The speech recognition system may, for example, include an automatic speech recognition ("ASR") component that recognizes human speech in detected audio. The speech recognition system may also include a natural language understanding ("NLU") component that determines user intent based on the detected audio. Also included within the speech recognition system may be a text-to-speech ("TTS") component capable of converting text to speech to be output by speaker(s) 210, and/or a speech-to-text ("STT") component capable of converting received audio signals into text to be sent to speech-processing system for processing.

The wakeword database may be a database stored locally by storage/memory 204 of electronic device 100, and may include a list of a current wakeword for electronic device 100, as well as one or more previously used, or alternative, wakewords for voice activated electronic device. In some embodiments, an individual may set or program a wakeword for their electronic device 100. The wakeword may be programmed directly on electronic device 100, or a wakeword or wakewords may be set by the individual via a local client application that is in communication with speech-processing system 200. For example, an individual may use their mobile device having the speech-processing system application running thereon to set the wakeword. The specific wakeword may then be communicated from the mobile device to speech-processing system 200, which in turn may send/notify electronic device 100 of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of audio may be stored within the sound profile database of storage/memory 204 on electronic device 100. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection system may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 100 may then begin transmitting the audio signal to speech-processing system 200 for detecting and responds to subsequent utterances made by an individual.

In some embodiments, electronic device 100 may be configured to send a notification to speech-processing system 200 in response to the wakeword or other activation being detected. For example, in response to detecting that the wakeword, "Alexa," has been uttered, electronic device 100 may determine a current device state, and send information associated with that device state to speech-processing system. In one embodiment, the device state may indicate whether or not content is currently being rendered by electronic device 100. For example, electronic device 100 may be receiving display data representing content, such as a graphical user interface, from a particular application associated with speech-processing system 200. In this instance, electronic device 100 may be configured to send a notification to speech-processing system 200 indicating that, at the time when the wakeword was uttered, content was currently being displayed thereby. The notification may, in one embodiment, be a logical 1/0, or TRUE/FALSE indicator that represents whether content is being displayed, or whether content is not being displayed. In some embodiments, additional information corresponding to what particular content is being displayed, what additional applications are running on electronic device 100, whether presence has been detected proximate to electronic device 100, and the like, may also be provided to speech-processing system 200 in response to the wakeword being uttered.

In some embodiments, storage/memory 204 may store voice biometric data associated with one or more individuals. For example, an individual that operates electronic device 100 may have a registered user account on speech-processing system 200 (e.g., within accounts system 268). In some embodiments, electronic device 100 may be associated with a group account, and various individuals may have user accounts that are operating under the rules and configurations of the group account. In one illustrative embodiment, voice biometric data for each member of the group account may be stored by that member's corresponding user account. The voice biometric data, for instance, may correspond to a "voice print," "voice model," or acoustic feature vector of a particular individual, which may be a graphical representation of a person's voice including a frequency decomposition of that individual's voice.

Communications circuitry 206 may include any circuitry allowing or enabling one or more components of electronic device 100 to communicate with one another, and/or with one or more additional devices, servers, and/or systems. For example, communications circuitry 206 may facilitate communications between electronic device 100 and speech-processing system 200. As an illustrative example, audio data representing an utterance (e.g., utterance 4 of FIG. 1) may be transmitted over a network 230, such as the Internet, to speech-processing system 200 using any number of communications protocols. For example, network(s) 230 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between electronic device 100 and speech-processing system 200. In some embodiments, electronic device 100 and speech-processing system 200 may communicate with one another via a web browser using HTTP. Various additional communication protocols may be used to facilitate communications between electronic device 100 and speech-processing system 200, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 206 may use any communications protocol, such as any of the previously mentioned exemplary communications protocols. In some embodiments, electronic device 100 may include one or more antennas to facilitate wireless communications with a network using various wireless technologies (e.g., Wi-Fi, Bluetooth, radiofrequency, etc.). In yet another embodiment, electronic device 100 may include one or more universal serial bus ("USB") ports, one or more Ethernet or broadband ports, and/or any other type of hardwire access port so that communications circuitry 206 allows electronic device 100 to communicate with one or more communications networks.

Electronic device 100 may also include one or more microphones 208 and/or transducers. Furthermore, one or more microphones located within a separate device may be in communication with electronic device 100 to capture sounds for electronic device 100. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, electronic device 100 may include multiple microphones (e.g., four, seven, ten, etc.) placed at various positions about electronic device 100 to monitor/capture any audio outputted in the environment where electronic device 100 is located. The various microphones 208 may include some microphones optimized for distant sounds, while some microphones may be optimized for sounds occurring within a close range of electronic device 100. In some embodiments, microphone(s) 208 may only begin to detect audio signals in response to a manual input to electronic device 100. For example, a manually activated device may begin to capture audio data using microphone(s) 208 in response to a user input, such as pressing a button, tapping a touch screen, or providing any touch input gesture to a touch input component.

Electronic device 100 may include one or more speakers 210. Furthermore, electronic device 100 may be in communication with one or more speaker(s) 210. Speaker(s) 210 may correspond to any suitable mechanism for outputting audio signals. For example, speaker(s) 210 may include one or more speaker units, speaker housings, transducers, arrays of speakers, and/or arrays of transducers that may be capable of broadcasting audio signals and/or audio content to a surrounding area where electronic device 100 may be located. In some embodiments, speaker(s) 210 may include headphones or ear buds, which may be wirelessly wired or hard-wired to electronic device 100 and capable of broadcasting audio directly to an individual.

In some embodiments, one or more microphones 208 may serve as input devices to receive audio inputs. Electronic device 100, in the previously mentioned embodiment, may then also include one or more speakers 210 to output audible responses. In this manner, electronic device 100 may function solely through speech or audio, without the use or need for any input mechanisms or displays, however this is merely exemplary.

Display screen 212 may correspond to a display device and/or touch screen, which may be any size and/or shape and may be located at any portion of electronic device 100. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display screen 212 may correspond to a projected capacitive touch ("PCT"), screen include one or more row traces and/or driving line traces, as well as one or more column traces and/or sensing lines. In some embodiments, display screen 212 may be an optional component for electronic device 100. For instance, electronic device 100 may not include display screen 212. Such devices, sometimes referred to as "headless" devices, may output audio, or may be in communication with a display device for outputting viewable content.

In some embodiments, electronic device 100 may receive content capable of being rendered by display screen 212 from speech-processing system 200. For example, a video functionality associated with speech-processing system 200 may send video data to electronic device 100, which in turn may be output by display screen 212. As another example, one or more functionalities/applications associated with speech-processing system may generate display data representing a graphical user interface, which may be sent to electronic device 100 and displayed by display screen 212.

Display screen 212, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display screen 212, a capacitance between the object and the conductive material may be formed. Processor(s) 202 may be capable of determining a location of the touch screen associated with where the capacitance change is detected, and may register a touch input as occurring at that location.

In some embodiments, display screen 212 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display screen 212 corresponding to where a conductive object contacted display screen 212.

A change in capacitance may be measured to determine a location on the touch screen where the object has contacted the surface. For example, if an individual touches a point on display screen 212, then a corresponding driving line and sensing line that intersect at that point may be identified. A location of the point may have one or more pixels associated with that location, and therefore one or more actions may be registered for an item or items that are displayed at that location. Processor(s) 202 of electronic device 100 may be configured to determine which pixels are associated with a particular location point, and which item or items are also displayed at that pixel location. Furthermore, electronic device 100 may be configured to cause one or more additional actions to occur to the item or items being displayed on display screen 212 based on a temporal duration the touch input, and or if one or more additional touch inputs are detected. For example, an object that contacted display screen 212 at a first location may be determined, at a later point in time, to contact display screen 212 at a second location. In the illustrative example, an object may have initially contacted display screen 212 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 212 having 100 driving lines and 100 sensing lines may have 100 intersection points, and therefore 100 individual capacitors, while a touch screen display screen 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by electronic device 100, and therefore the fewer driving lines and/or sensing lines used, the smaller the amount of power that is needed to operate the touch screen display.

In some embodiments, display screen 212 may correspond to a high-definition ("HD") display. For example, display screen 212 may display images and/or videos of 720p, 1080p, 1080i, or any other image resolution. In these particular scenarios, display screen 212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, persons of ordinary skill in the art will recognize that the aforementioned display ratios and pixel numbers are merely exemplary, and any suitable display resolution or pixel number may be employed for display screen 212, such as non-HD displays, 4K displays, and/or ultra displays.

In some embodiments, content displayed on display screen 212 may be formatted such that contextual entities and lists are able to be analyzed by speech-processing system 200 for list resolution and/or anaphora resolution. Context related to the displayed content may include entities associated with electronic device 100 including, but not limited to, foreground entities (e.g., lists of items, detail pages), background entities (e.g., songs, audio books), and notification entities. The contextual metadata may be structured into contextual entity slots, list metadata, and any other additional data available. For example, contextual entity slots may correspond to data used for list resolution and/or anaphora resolution. The contextual entity slots may be specified in domain definitions with corresponding values. The list metadata may include list identifiers, item identifiers for items of a list, and absolute positions of the list for a particular item (e.g., a first item of a list, a second item of a list, etc.). Such additional data may include unique identifiers associated with an object, item prices, quantities, and the like.

In some embodiments, electronic device 100 may include one or more cameras 214, corresponding to any suitable image capturing component or components capable of capturing one or more images and/or videos. Camera(s) 214 may, in some embodiments, be configured to capture photographs, sequences of photographs, rapid shots (e.g., multiple photographs captured sequentially during a relatively small temporal duration), videos, or any other type of image, or any combination thereof. In some embodiments, electronic device 100 may include multiple cameras 214, such as one or more front-facing cameras and/or one or more rear facing cameras. Furthermore, camera(s) 214 may be configured to recognize far-field imagery (e.g., objects located at a large distance away from electronic device 100) or near-filed imagery (e.g., objected located at a relatively small distance from electronic device 100). In some embodiments, the camera(s) may be high-definition ("HD") cameras, capable of obtaining images and/or videos at a substantially large resolution (e.g., 726p, 1080p, 1080i, etc.). In some embodiments, camera(s) 214 may be optional for electronic device 100. For instance, camera(s) 214 may be external to, and in communication with, electronic device 100. For example, an external camera may be capable of capturing images and/or video, which may then be provided to electronic device 100 for viewing and/or processing.

Persons of ordinary skill in the art will recognize that, in some embodiments, display screen 212 and/or camera(s) 214 may be optional for electronic device 100. For instance, electronic device 100 may function using audio inputs, and outputting audio in response or causing one or more actions to occur in response, and therefore display screen 212 and/or camera(s) 214 may not be included. Furthermore, in some embodiments, electronic device 100 may not include display screen 212 and/or camera(s) 214, but instead may be in communication with display screen 212 and/or camera(s) 214. For example, electronic device 100 may be connected to a display screen via a Wi-Fi (e.g., 802.11 protocol) connection such that visual content sent to electronic device 100 may be sent to the display screen, and output thereby.

In one exemplary embodiment, electronic device 100 may include an additional input/output ("I/O") interface. For example, electronic device 100 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of electronic device 100 may include one or more lights, light emitting diodes ("LEDs"), or other visual indicator(s). Persons of ordinary skill in the art will recognize that, in some embodiments, one or more features of the output portion of the I/O interface may be included in a purely voice activated version of electronic device 100. For example, one or more LED lights may be included on electronic device 100 such that, when microphone(s) 208 receive audio, the one or more LED lights become illuminated signifying that audio has been received by electronic device 100. In some embodiments, one or more vibrating mechanisms or other haptic features may be included with electronic device 100 to provide a haptic response to an individual.

In some embodiments, electronic device 100 may include radio-frequency identification ("RFID") functionality and/or near field communication ("NFC") functionality. Furthermore, in some embodiments, electronic device 100 may include one or more infrared ("IR") sensors and one or more IR emitters. The IR sensors/emitters may be used to determine depth information. For example, in one embodiment, a distance of an individual from electronic device 100 may be determined using the one or more IR sensors/emitters. Depth determination may be performed using any depth determination technique. In some embodiments, a distance between an individual and electronic device 100 may be employed as a basis for presenting content with varying density using display screen 212. In some embodiments, electronic device 100 may include beaconing functionality that allows electronic device 100 to recognize when one or more devices are located nearby. For example, electronic device 100 may include beaconing detection functionality that generates a beaconing signal, and attempts to determine whether any devices nearby are capable of detecting that signal. If so, then that may indicate that a particular device is proximate to electronic device 100.

In some embodiments, contextual metadata may be obtained by computer vision analysis of an object detected by camera(s) 214. For example, in response to speaking the utterance, "Buy this," electronic device 100 may cause camera(s) 214 to capture an image. That image may be analyzed to determine what the object is, and the contextual metadata associated with that object's identity may be determined. For instance, if an individual is holding up a bottle of ketchup, then the computer vision analysis may be able to determine a product name, bar code, and/or any other attribute about the bottle of ketchup from the captured image, and may populate a contextual metadata structure indicating the determined values (e.g., 'Item Name' slot: "Ketchup").

Speech-processing system 200 may include various components and modules including, but not limited to, automatic speech recognition ("ASR") system 258, natural language understanding ("NLU") system 260, functionalities system 262, text-to-speech ("TTS") module 264, and user accounts system 268. In some embodiments, speech-processing system 200 may also include an orchestrator system 250 capable of orchestrating one or more processes to be performed by one or more of ASR system 258, NLU system 260, functionalities system 262, TTS system 264, and/or user accounts system 268, as well as one or more additional components, devices, and/or systems associated therewith. Speech-processing system 200 may also include computer readable media, including, but not limited to, flash memory, random access memory ("RAM"), and/or read-only memory ("ROM"). Speech-processing system 200 may also include various modules that store software, hardware, logic, instructions, and/or commands for speech-processing system 200, such as a speaker identification ("ID") module, or any other module, or any combination thereof.

ASR system 258 may be configured to recognize human speech in detected audio, such as audio captured by electronic device 100, which may then be transmitted to speech-processing system 200. ASR system 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. Processor(s) 252, in one embodiment, may be configured to perform one or more of the corresponding functions associated with ASR system 258, as described herein, based on data received by communications circuitry 256 and/or information stored by storage/memory 254. Furthermore, in some embodiments, ASR system 258 may include speech-to-text ("STT") system 266. STT system 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR system 258 may include an expression detector that analyzes audio signals received by speech-processing system 200, such as the expression detector mentioned above with regards to electronic device 100. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a confidence score indicating a likelihood that a particular word or phrase, is represented within the audio signal. The expression detector may then compare that confidence score to a threshold value to determine whether that word or phrase will be declared as having been spoken. In some embodiments, the confidence scores associated with each word may be provided to NLU system 260, and in particular, feature extractor system 280, as described in greater detail below.

For instance, ASR system 258 may transcribe received audio data into text data representing the words of the speech contained in the audio data using STT system 266. The text data may then be used by other components for various purposes, such as executing system commands, inputting data, etc. ASR system 258 may then interpret an utterance based on the similarity between the utterance and pre-established language models stored in an ASR model knowledge base of storage/memory 254. For example, the input audio data may be compared with models for sounds (e.g., sub-word units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing a likelihood that a particular set of words matches those spoken in the utterance. The confidence score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, ASR system 258 may output the most likely text recognized in the audio data. ASR system 258 may also output multiple hypotheses in the form of a lattice or an N-best list with each hypothesis corresponding to a confidence score or other score (such as probability scores, etc.).

ASR system 258 may further attempt to match received feature vectors to language phonemes and words as known in acoustic models and language models stored within storage/memory 254 of ASR system 258. Recognition scores may be determined for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, application enablement/disablement, shopping, etc.

ASR system 258 may generate results in the form of a single textual representation of the speech, an N-best list including multiple hypotheses and respective scores, and/or lattice, for example, which may be sent to NLU system 260 for processing, such as conversion of the text into commands for execution, either by electronic device 100, speech-processing system 200, or by another device, such as a separate device or server capable of performing one or more additional functionalities thereon (e.g., a television capable of outputting video content).

NLU system 260 may be configured such that it determines an intent of an utterance based on the received audio data. NLU system 260 may determine one or more domains, which may also be referred to as categories, that may be capable of handling the intent of the utterance. For example, utterance 4, "Play 'Video 1'," may be identified by each of a "Music" domain, an "E-Book" domain, and a "Video" domain as possibly being able to handle the corresponding request. For instance, NLU system 260 may identify that the word "Play" may be a recognized intent of each of the aforementioned domains (as well, possibly, other domains). In some embodiments, to determining an utterance's intent, NLU system 260 may communicate with functionalities system 262 to cause one or more specific functionalities to be accessible, perform one or more tasks, and/or retrieve an appropriate response or response information. NLU system 260 may include processor(s) 252, storage/memory 254, and communications circuitry 256 which, in one embodiment, may be substantially similar to processor(s) 202, storage/memory 204, and communications circuitry 206 of electronic device 200, and the previous description may apply. Processor(s) 252, in one embodiment, may be configured to perform one or more of the corresponding functions associated with NLU system 260, as described herein, based on data received by communications circuitry 256 and/or information stored by storage/memory 254, as well as based on NER system 272, IC system 274, slot filler system 276, entity resolution system 278, contextual resolution system 270, feature extractor system 280, domain re-ranker system 282, and/or domain classifier system 286.

NLU system 260 may include a named entity recognition ("NER") system 272, which may be used to identify portions of text that correspond to a named entity recognizable by NLU system 260. A downstream process called named entity resolution may be configured to link a portion of text to an actual specific known entity. To perform named entity resolution, NLU system 260 may utilize gazetteer information stored in an entity library storage. The gazetteer information may be used for entity resolution, for example matching ASR results with different entities (such as song titles, contact names, etc.). Gazetteers may be linked to a user account or profile of users accounts module 268, certain domains (e.g., music or shopping), or may be organized in a variety of other ways.

Generally, NLU system 260 takes textual input and attempts to make a semantic interpretation of the text. That is, NLU system 260 may be configured to determine a meaning of text based on the individual words and then implements that meaning. In some embodiments, NLU system 260 may interpret a text string to derive an intent or a desired action of the utterance (e.g., utterance 4) as well as the pertinent pieces of information in the text that allow an action to be completed. For example, if a spoken utterance is processed by ASR system 258 and outputs the hypothesis text, "call mom," NLU system 260 may determine that an intent of the utterance is to activate a telephone, or telephone functionality, and to initiate a call with a contact matching the entity "mom." In some embodiments, NLU system 260 may process several textual inputs (e.g., hypotheses texts) related to the same utterance. For example, if ASR system 258 outputs N hypothesis texts (as part of an N-best list), then NLU system 260 may process all N outputs.

As will be discussed further below, NLU system 260 may be configured to parse and tag annotate text. For example, for the text "call mom," "call" may be tagged as a command (e.g., a command to execute a phone call), and "mom" may be tagged as a specific entity and target of the command (e.g., a telephone number for the entity corresponding to "mom" stored in a contact list). Further, NLU system 260 may be used to provide answer data in response to queries, for example using a knowledge base stored within storage/memory 254 of NLU system 260 and/or storage/memory of speech-processing system 200.

To correctly perform natural language understanding processing of speech input, NLU system 260 may be configured to determine a domain of an utterance. By determining the domain, NLU system 260 may narrow down which services and functionalities offered by an endpoint device (e.g., electronic device 100, speech-processing system 200, or any other electronic device or system) may be relevant. For example, an endpoint device may offer services relating to interactions with a telephone service, a contact list service, a calendar/scheduling service, a music player service, etc. As another example, an endpoint device may enable certain services or functionalities for an individual having a user account of speech-processing system 200. Words in a single hypothesis text query may implicate more than one service, and some services may be functionally linked (e.g., both a telephone service and a calendar service may utilize data from the contact list).

NER system 272 may be configured to receive a hypothesis text query in the form of one or more results from ASR system 258. NER system 272, which is described in greater detail within FIG. 2B, may then attempt to identify relevant grammars and lexical information that may be used to construe meaning of the one or more results. To do so, NER system 272 may begin by identifying potential domains that may relate to the received query. NLU system 260, may include a databases of devices within storage/memory 254 of NLU system 260 that may be used to identify domains associated with specific devices. For example, electronic device 100 may be associated with domains for music, telephone functionality, calendar information, contact lists, and/or device-specific communications. In addition, NLU system 260 may store an entity library including database entries for specific services available on a specific device or devices, either indexed by that device's identification number, a customer identification number, a household identification number, and/or using any other suitable indicator.

In one non-limiting embodiment, a domain may represent a discrete set of activities, services, and/or functionalities that have a common theme, such as "shopping," "music," and/or "videos." As such, each domain may be associated with a particular language model and/or grammar database, a particular set of intents/actions, and a particular personalized lexicon. In some embodiments, each user account may have its own language model including words, phrases, sentence structures, response templates, and the like, configured for the user account. Each gazetteer may include domain-indexed lexical information associated with a particular user account of user accounts system 268 and/or electronic device 100. For example, a first gazetteer may include first domain-index lexical information. A user's music-domain lexical information might include album titles, artist names, and song names, for example, whereas a user's contact-list lexical information might include the names of contacts. Since every user's music collection and contact list is presumably different, this personalized information improves entity resolution.

In some embodiments, NLU system 260 may be configured to apply the rules, models, and information applicable to each identified domain. For example, if a query potentially implicates both communications and music, the query may, substantially in parallel, cause NLU system 260 to use the grammar models and lexical information for communications, as well as the grammar models and lexical information for music. The responses based on the query produced by each set of models is scored, with the overall highest ranked result from all applied domains is ordinarily selected to be the correct result, which is described in greater detail below with reference to FIG. 2B.

An intent classification ("IC") system 274 may parse the query to determine an intent or intents for each identified domain, where the intent corresponds to the action to be performed that is responsive to the query. Each domain is associated with a database of words linked to intents. For example, a music intent database of a music domain may link words and phrases such as "play," to a "Play Music" intent, "stop," to a stop playing music intent, and "mute" to a mute volume intent. IC system 274 may be configured to identify potential intents for each domain by comparing words in the query to the words and phrases in that domain's intents database. Traditionally, the determination of an intent by IC system 274 is performed using a set of rules or templates that are processed against the incoming text to identify a matching intent.

In order to generate a particular interpreted response, NER system 272 applies the grammar models and lexical information associated with a respective domain to actually recognize one or more entities in the text of the query. Each grammar model includes the names of entities (i.e., nouns) commonly found in speech about that particular domain (i.e., generic terms), whereas the lexical information from the gazetteer is personalized to the user(s) and/or the device. For instance, a grammar model associated with the shopping domain may include a database of words commonly used when people discuss shopping.

The intents identified by IC system 274 may be linked to domain-specific grammar frameworks having "slots" or "fields" to be filled. Each slot or field may correspond to a portion of the query text that the system believes corresponds to an entity. For example, if "play music" is an identified intent, a grammar framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

NER system 272 may parse the hypothesis text query to identify words as being subject, object, verb, preposition, etc., based on grammar rules and/or models, prior to resolving named entities. The identified verb may be used by IC module 274 to identify, or initially identify, an intent, which is then used by NER system 272 to identify frameworks. A framework for an intent of "play" may specify a list of slots/fields/placeholders applicable to place the identified "object," such as, for example, {Artist Name}, {Album Name}, {Song Name}, {Application Name}, {Anaphoric Term}, and any object modifier (e.g., a prepositional phrase). NER system 272 may then search the corresponding fields in the domain-specific and personalized lexicon(s), attempting to match words and phrases in the query, which are tagged as a grammatical object or object modifier, with those identified in the database(s).

This process may include semantic tagging, which is the labeling of a word or a combination of words according to their type/semantic meaning. Parsing may be performed using heuristic grammar rules, or an NER model may be constructed using techniques such as hidden Markov models, maximum entropy models, log linear models, conditional random fields ("CRF"), and the like.

For instance, a hypothesis text query from an utterance of "Play 'Song 1' by 'Artist 1'," might be parsed and tagged as {Verb}: "Play," {Object}: "Song 1," {Object Preposition}: "by," and {Object Modifier}: "Artist 1." At this point in the process, "Play" may be identified as a verb based on a word database associated with the music domain, which IC module 276 may determine corresponds to the "play music" intent. No determination has been made as to the meaning of "Song 1" and "Artist 1," but based on grammar rules and models, it may be determined that the text of these phrases relate to the grammatical object (i.e., entity) of the query. Similarly, "Play" may also be identified as verb based on a word database associated with a video domain, an e-book domain, and/or one or more additional domains.

The frameworks linked to the intent may then be used to determine what database fields should be searched to determine the meaning of these phrases, such as searching a user's gazette for similarity with the framework slots. So a framework for a "play music" intent might attempt to resolve the identified object for {Artist Name}, {Album Name}, {Song Name}, and {Application Name}, {Anaphoric Term} and another framework for the same intent might attempt to resolve the object modifier based on {Artist Name}, and resolve the object based on {Album Name} and {Song Name} linked to the identified {Artist Name}. If the search of the gazetteer does not resolve a slot/field using gazetteer information, NER system 272 may search the database of generic words associated with the particular domain. So for instance, if the query was "play songs by 'Artist 1,'" after failing to determine an album name or song name called "songs" by "Artist 1," NER system 272 may search the domain vocabulary for the word "songs." For example, use of the object "songs" may correspond to some or all of the songs associated with a particular artist (e.g., "Artist 1"). In the alternative, generic words may be checked before the gazetteer information, or both may be tried, potentially producing two different results.

The results of the natural language understanding processing may be tagged to attributing meaning to the query. So, for instance, "Play 'Song 1' by 'Artist 1'" might produce a result of: {Domain}: "Music," {Intent}: "Play Music," {Artist Name}: "Artist 1," {Media Type}: "Song," and {Song Name}: "Song 1." As another example, "Play songs by 'Artist 1'" might produce: {Domain}: "Music," {Intent}: "Play Music," {Artist Name}: "Artist 1," and {Media Type}: Song. Still further, "Add this to my cart'" might produce a result of: {Domain} Shopping, {Intent} "Add item to," {Anaphoric Term}: "this," and {List Type} "cart."

The output from NLU system 260 (which may include tagged text, commands, etc.) may then be sent to orchestrator 250 and/or a command processor, which may be located on, or may be in communication with, speech-processing system 200. The destination command processor may be determined based on the output of NLU system 260. For example, if NLU system 260 outputs include a command to play music, the destination command processor may be a music playing application, such as one located on electronic device 100 or in a music playing application, configured to execute a music playing command to cause a particular audio file to output. If the output of NLU system 260, however, includes a search request, the destination command processor may include a search engine processor, such as one located on a search server, configured to execute a search command. If the output of NLU system 260 includes a request for enablement of an application's functionalities for a particular user account, then the language model for the user account may be updated to include one or more invocations, utterance frameworks, response frameworks, and values for the frameworks, for a particular application.

In some embodiments, NLU system 260 may also include an entity resolution module 278, which allows NLU system 260 to query each domain of NLU system 260 to determine which domain or domains believe that they can handle a given request. Upon performing the query, each domain may return a "score" indicating a likelihood that they can handle the application in question. For instance, domains may return scores of LOW, MEDIUM, or HIGH, reflective of the likelihood that the particular domain can handle the particular application. Entity resolution system 278 may return application names or titles for the request, which may be based on relevance scores that estimate a confidence that a particular application/functionality may be best used for the request. As an illustrative example, if the utterance is, "Play my music," NLU system 260 may determine, using entity resolution system 278, which domains, and thus applications/functionalities, can likely handle this request, and may select the domain and/or application/functionality having the highest confidence score as being the domain and/or application able to handle the request. Furthermore, as described in greater detail below with reference to FIG. 2B, NLU system 260 may further include a slot filler module 276. Still further, in some embodiments, domain re-ranking may be performed based on contextual information regarding content being rendered by electronic device 100 at a time when the request was received.

In some embodiments, NLU system 260 may include a contextual resolution system 270, which may be a system configured to identify entities for assisting natural language understanding processing using contextual metadata corresponding to content being displayed by display screen 212. Contextual resolution system 270 may receive contextual metadata from orchestrator 250 (e.g., that may be generated and sent from a particular domain associated with functionalities system 262) and/or from electronic device 100. The contextual metadata may include information associated with the particular content currently being rendered by a requesting device. In some embodiments, the contextual metadata may be obtained in response to receiving audio data. For example, in response to receiving audio data representing utterance 4, voice activated electronic device 100 may send a notification to speech-processing system 200 that indicates that content is currently being rendered by display screen 212.

In one embodiment, orchestrator 250 may be configured to receive the audio data, and may determine that the notification has also been received. Orchestrator 250 may determine whether or not the notification indicates that there is (or was) content displayed by display screen 212 at the time that the utterance was spoken (e.g., when the wakeword was uttered). However, persons of ordinary skill in the art will recognize that the determination of whether content is being displayed by display screen 212 may correspond to a time just prior to the wakeword being uttered, when the wakeword was uttered, after the wakeword was uttered, during the utterance being spoken, after the utterance was spoken, and/or after the audio data is sent to speech-processing system 200, and the aforementioned is merely exemplary. The notification may correspond to a flag, such as a logical 1/0, where if the flag has a value of 1, then this may indicate that content is being rendered by electronic device 100, whereas if the flag has a value of 0, then this may indicate that not content is being rendered by electronic device 100.

Upon determining that electronic device 100 is rendering content (e.g., receiving a notification indicating that content is being displayed by display screen 212), orchestrator 250 may generate and send a request to the various domains associated with functionalities system 262 and NLU system 260. The request may inquire as to which domain, or domains, are currently providing electronic device 100 with content, such as the content being rendered. Upon determining that domain, or domains, that are providing content, orchestrator 250 may request that the identified domain(s) generate and send contextual metadata representing text corresponding to the displayed content. After receiving the contextual metadata from the corresponding domain(s), orchestrator 250 may provide the contextual metadata to contextual resolution system 270, or otherwise cause the contextual metadata to be sent to NLU system 260.

In some embodiments, the various domains may include formatting logic (e.g., speechlets) that may format the contextual metadata. The contextual metadata may be structured, in response to the formatting logic applying its formatting rules, such that attributes of the content are arranged in contextual slots including values associated with those slots. For instance, the contextual metadata may also be referred to, or may generally correspond to, entity data representing content being displayed by display screen 212 during a time when an utterance is spoken. For example, single item or detail web page of an item, such as a coffee maker, may include entity data organized into contextual slots such as {Item Name}, {List Position}, and {Item Identifier}. Values from the particular web page being displayed currently by display screen 212 may include: {Item Name}: "Coffee Maker," {List Position}: "1," and {Item Identifier}: "abcd1234." Different types of content may include different types of contextual slot data representing different contextual slots. For example, lists may include {List Types}, {List Position}, {List Name}, etc.

In some embodiments, contextual resolution system 270 may determine whether any slots/fields from intent resolution processing by NLU system 260 substantially match any slots/fields from the contextual metadata received. For instance, the entity data that is received from the domain may include similar entities (e.g. slot data) as the entities associated with the intent identified by NLU system 260. This may include having contextual slot data representing contextual slots from the contextual metadata being associated with similar attributes as the types of slot data from intent resolution by NLU system 260. As an example, the "Play Music" intent may include one or more types of slot data such as application data—{Application Data}, song name—{Song Name}, album name—{Album Name}, artist name—{Artist Name}, genre name—{Genre Name}, playlist name {Playlist Name}, media type—{Media Type}, sort type—{Sort Type}, play mode—{Play Mode}, service name—{Service Name}, anaphor—{Anaphor}, list position—{List Position}, recommend trigger—{Recommended Trigger}, and similar trigger—{Similar Trigger}. From NLU system 260, the text data may be used to identify some or all of the values for these types of slot data. For example, if the utterance is, "Play 'Song 1'," then {Song Name} may have a value "Song 1." However, the remaining slot data may representing slots that remain unfilled. The contextual metadata may indicate information regarding a GUI displayed by display screen 212, where the GUI includes a detailed page associated with a song (e.g., "Song 1") or be a list including one item, the song. For example, the contextual metadata may include slot data representing a song name contextual slot, {Song Name}, with a filled value being "Song 1," as well as an album name contextual slot, {Album Name}, having a filled value "Album 1." In this particular scenario, the album name contextual slot data {Album Name} may be provided to NLU system 260.

Contextual resolution system 270 may, in some embodiments, be configured to determine that one or more of the declared slots from the intent matches one or more contextual entity slots from the contextual metadata. This may allow for resolution of the entity based on the contextual metadata. For example, if an individual says, "Play 'Song 1'," and the contextual metadata indicates that there is contextual entity slot data {Song Name} having a value "Song 1," then the specific song to be played may be determined to be the audio filed associated with "Song 1."

Contextual resolution system 270, in one embodiment, may be configured to determine a heuristics score that indicates a number of matching entities (e.g., matching types of slot data) between the entity data/contextual metadata and the declared slots for the identified intent. For example, using the previous example, the contextual metadata may include slot data representing such types of slots as {Song Name}, {Album Name}, and/or {Artist Name}, amongst other types of slots. Therefore, in this particular scenario, the heuristics score may be three, indicating that there are three slots corresponding to similar entities for both the declared slots from IC component 274 and contextual resolution system 270. If the heuristics score is greater than zero, then NLU system 260 may be configured to generate a selected context file that may be included with the output data from NLU system 260, which orchestrator 250 may provide back to an application, or applications, of functionalities system 262 to perform, or attempt to perform, one or more actions.

NLU system 260 may also include a domain classifier 286, which may be configured to take the text data associated with the utterance and outputs a probability of that particular utterance coming from one of the domains included with NLU system 260. Each domain associated with NLU system 260 (which are described in greater detail below with reference to FIG. 2B) will have a probability score associated with them that indicates a probability that the utterance corresponds to that corresponding domain. The scores may be used by domain re-ranker 282 to assist in re-ranking the intent hypotheses. The probability scores for each domain, as determined by domain classifier 286, may lack the contextual knowledge associated with the utterance. Therefore, the probability scores may serve as inputs for domain re-ranker 282. Domain classification processing performed by domain classifier 286 may occur substantially in parallel to NER processing, IC processing, slot filler processing and entity resolution processing, for instance. The results of each of these processing may be used together by domain re-ranker 282 to re-rank the list of intent hypotheses.

In some embodiments, NLU system 260 may also include a feature extractor system 280, or a "feature extractor." Feature extractor system 280 may be configured to identify features associated with contextual metadata or entity data corresponding to content rendered by electronic device 100 and provided by a particular domain. For example, electronic device 100 may display a graphical user interface including a list of songs, where each item of the list includes various characteristics related to that particular song (e.g., song title, song duration, artist name, etc.). When entity data is passed to NLU system 260 from the domain responsible for providing the content (e.g., the GUI) to electronic device 100, feature extractor system 280 may be configured to "extract," or otherwise recognize, these features within the content. To do this, each domain may be configured, as mentioned previously, to format the content that will be output by that domain to include slot data that match the intent specific slot data from intent classification processing. For example, a "play music" intent may include such types of slot data as "Song Title" slot data representing a "Song Title" slot, "Artist Name" slot data representing an "Artist Name" slot, and "Album Name" slot data representing an "Album Name" slot. Therefore, in this particular example, the music domain may be configured to format the content it displays, such as a detailed page for a particular song being played or to be played, to also include slot data corresponding to one or more of the "Song Title" slot, the "Artist Name" slot, and the "Album Name" slot, which each may also include an associated value (e.g., the song's title, the artist's name, and/or the album's name). Thus, when the entity data representing the content is received, feature extractor system 280 may be able to determine that the content included slot data corresponding to the one or more slots (e.g., "Song Title" slot data, "Artist Name" slot data, and "Album Name" slot data).

Feature extractor system 280 may also, but without limitation, determine additional "features" associated with the request, the entity data, user history, and/or additional applications that are running at a time when the utterance was spoken. For example, feature extractor system 280 may determine, in addition to determining which domain is providing the content being rendered by electronic device 100, any additional domains currently "in use" by electronic device 100. For instance, if a list is being viewed while a song is playing, then feature extractor system 280 may also determine that the music domain is providing content to electronic device 100, and may extract features related to that content from the music domain. In some embodiments, feature extractor system 280 may also determine presence information associated with electronic device 100. The presence information may indicate a presence status of electronic device 100. In other words, the presence information may indicate whether or not human presence has been detected by electronic device 100. As an illustrative example, in response to receiving audio data representing an utterance, presence data indicating whether human presence has been detected proximate to electronic device 100 may also be received by speech-processing system 200. Feature extractor 280 may then be provided with the presence data to determine whether electronic device 100 has detected presence. Using feature extractor system 280, features associated with multiple aspects of a request may be employed by a domain re-ranker system 282, which is described in greater detail below with reference to FIG. 2B, to re-rank domains as being more or less likely to correspond to an utterance's intent.

Functionalities system 262 may, for example, correspond to various action specific applications, which are capable of processing various task specific actions and/or performing various functionalities. Functionalities system 262 may further correspond to first party applications and/or third party applications capable of performing various tasks or actions, or performing various functionalities. For example, based on the context of the audio received from electronic device 100, speech-processing system 200 may use a certain application to generate a response, or to obtain response information, which in turn may be communicated back to electronic device 100 and/or to another electronic device (e.g., a television). Functionalities system 262 may also include processor(s) 252, storage/memory 254, and communications circuitry 256. Processor(s) 252, in one embodiment, may be configured to perform one or more of the corresponding functions associated with functionalities system 262, as described herein, based on data received by communications circuitry 256 from one or more other systems (e.g., orchestrator 250, ASR system 258, and/or NLU system 260) and/or information stored by storage/memory 254.

In some embodiments, an application of functionalities system 262 may be written in various computer languages, such as JavaScript and Java. Various applications may include an intent schema file and a sample utterances file, such as, for example, IntentSchema.json including the JSON defining the intents of a particular application, and a SampleUtterances.txt including plain text sample utterances for the particular application. Applications may also include application specific code, such as a JavaScript or Java file, common library code, and various other JavaScript or Java modules.

TTS system 264 may employ various text-to-speech techniques. TTS system 265 may include a speech synthesis system 284, which may be configured to take input text and generate audio based on the text. However, techniques for transcribing text into speech are well known in the art and need not be described in further detail herein, any suitable computer implemented text to speech technique may be used to convert the input text into output audio, such as SOFT-SOUND speech processing technologies available from the Autonomy Corporation, which is headquartered in Cambridge, England, United Kingdom. TTS system 264 may also include processor(s) 252, storage/memory 254, and communications circuitry 256. Processor(s) 252, for instance, may be configured to perform one or more of the corresponding functions associated with TTS system 264, as described herein, based on data received by communications circuitry 256 from one or more additional systems (e.g., functionalities system 262, NLU system 260, etc.) and/or information stored by storage/memory 254.

User accounts system 268 may store one or more user accounts or user profiles, corresponding to users having an account on speech-processing system 200. For example, a parent may have an account registered on speech-processing system 200, and each of the parent's children may have their own user profile registered under the parent's account. Information, settings, and/or preferences, for example, for each user profile may be stored by user accounts system 268. In some embodiments, user accounts system 268 may store a voice signal, such as voice biometric information, for a specific user profile. This may allow speaker identification techniques to be used to match a voice to voice biometric data associated with a specific user profile. In some embodiments, user accounts system 268 may store a telephone number assigned to a particular user profile. In some embodiments, user accounts system 268 may include a list of media items currently stored within an individual's registered account or user profile. For example, a list of music or videos purchased or obtained by an individual may be stored within the individual's user profile on user accounts system 268, which may be accessed by the individual when the individual seeks to hear a particular song or songs, or view a particular video or videos. User accounts system 268 may also include a listing of all applications currently enabled for each user profile. In some embodiments, NLU system 260 may receive indications of which applications are currently enabled for a particular user profile or account, such that NLU system 260 is aware of which rules and capabilities that speech-processing system 200 is able to perform for the particular user profile or account. User accounts system 268 may also include processor(s) 252, storage/memory 254, and communications circuitry 256. Processor(s) 252, in one embodiment, may be configured to perform one or more of the corresponding functions associated with user accounts system 268, as described herein, based on data received by communications circuitry 256 from one or more additional systems (e.g., functionalities system 262, NLU system 260, etc.) and/or information stored by storage/memory 254

Orchestrator 250, in a non-limiting embodiment, may correspond to any suitable device, system, and/or logic capable of performing one or more processes. For example, orchestrator 250 may be configured to request contextual metadata from one or more domains/applications of functionalities system 262 in response to receive a notification from electronic device 100 that content is currently being rendered thereby. In response to receiving the contextual metadata, orchestrator 250 may be configured to provide the contextual metadata to NLU system 260. In one embodiment, orchestrator 250 may include processor(s) 252, storage/memory 254, and communications circuitry 256. Processor(s) 252, in one embodiment, may be configured to perform one or more of the corresponding functions associated with computing system 200, as described herein, based on data received by communications circuitry 256 from one or more additional systems and/or information stored by storage/memory 254

Persons of ordinary skill in the art will recognize that although each of ASR system 258, NLU system 260, functionalities system 262, TTS system 264, user accounts system 268, and orchestrator 250 may each include instances of processor(s) 252, storage/memory 254, and communications circuitry 256, and those instances of processor(s) 252, storage/memory 254, and communications circuitry 256 within each of ASR system 258, NLU system 260, functionalities system 262, TTS system 264, user accounts system 268, and orchestrator 250 may differ. For example, the structure, functionality, and style of processor(s) 252 within ASR system 258 may be substantially similar to the structure, functionality, and style of processor(s) 252 within NLU system 260, however the actual processor(s) 252 need not be the same entity.

Figure 2B:
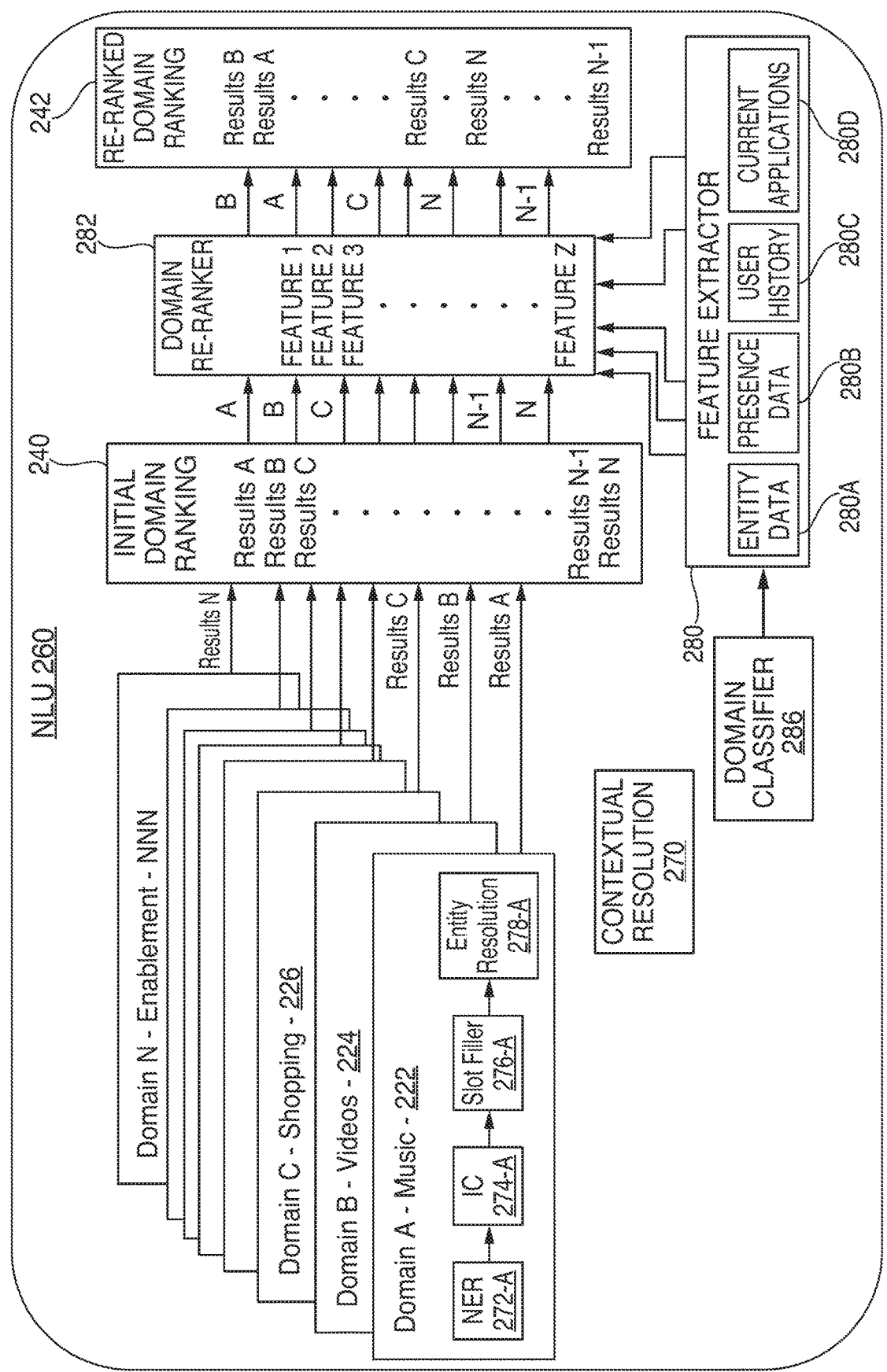
FIG. 2B is an illustrative diagram of a multi-domain architecture for an NLU system of FIG. 2A, in accordance with various embodiments.

FIG. 2B is an illustrative diagram of a multi-domain architecture for an NLU system of FIG. 2A, in accordance with various embodiments. In NLU system 260, each domain (which may include a set of intents and entity slots that define a larger concept, such as music, books, videos, etc.) may be constructed separately and be made available to NLU system 260 during runtime operations where natural language understanding processing is performed on text queries (such as text output from ASR system 258). Each domain may have specially configured components to perform various steps of the NLU operations. For instance, each domain may include a component of NER system 272, IC system 274, Slot Filler system 276, and entity resolution system 278, which may be specific to that particular domain. In some embodiments, slot filler system 276 and/or entity resolution system 278 may be configured to perform their corresponding functions without deferring until after initial domain ranking has occurred, however persons of ordinary skill in the art will recognize that this is merely exemplary. Furthermore, a language model associated with a particular user account may specify various input and output characteristics of NLU system 260, which may vary from user to user based on that particular user's language model.

In the illustrative embodiment, a music domain 222 (Domain A) may have an NER component 272-A that identifies what slots, fields, or placeholders (i.e., portions of input text) may correspond to particular entities relevant to that domain. The NER component 272-A may use a machine learning model, such as a domain specific conditional random field ("CRF") to both identify the portions corresponding to an entity as well as identify what type of entity corresponds to the text portion. For example, for the text "play songs by 'Artist 1'," an NER component trained for a music domain may recognize the portion of text (e.g., "Artist 1") corresponds to an entity and an artist name. Music domain 222 may also have its own intent classification (IC) component 274-A that determines the intent of the text, assuming that the text is within the proscribed domain. IC components may use a model, such as a domain specific maximum entropy classifier, to identify the intent of the text. Music domain 222 may also have its own Slot Filler component 276-A that can apply rules or other instructions to standardize labels or tokens from previous stages into an intent/slot representation. The precise transformation may depend on the domain. For example, a travel domain may include a text mention of "<Location> airport," and may be transform the text mentioned to the standard three-letter code referring to that airport (e.g., ZZZ). Music domain 222 may also have its own Entity Resolution component 278-A that can refer to an authority source (such as a domain specific knowledge base) used to specifically identify the precise entity referred to in the entity mention identified in the incoming text. Specific intent/slot combinations may also be tied to a particular source, which may then be used to resolve the text (such as by providing information or a command to be executed in response to a user query). Using the example, "Play songs by 'Artist 1'," the source may be tied to a listing of applications and the application names associated with those applications. The output from Entity Resolution component 278-A may include a command, information, or other NLU result data indicating how the domain specific NLU processing handled the text and how the system should respond to the text, according to that specific domain.

As another example, a video domain 224 (Domain B) may have an NER component 272-B that may identify a portion of the input text that may refer to a particular slot. For example, for the text "play 'Video 1'," an NER component trained for a music domain may recognize the portion of text (e.g., "Artist 1") corresponds to an entity and an artist name. Music domain 224 may also have its own intent classification (IC) component 274-B that may determine the intent of the text, assuming that the text is within the proscribed domain. Video domain 224 may also have its own Slot Filler component 276-B that can apply rules or other instructions to standardize labels or tokens from previous stages into an intent/slot representation. Video domain 224 may also have its own Entity Resolution component 278-A that can refer to an authority source (such as a domain specific knowledge base) used to specifically identify the precise entity referred to in the entity mention identified in the incoming text. Furthermore, entity resolution component 276-D, as well as, in one embodiment, slot filler 276-C, may determine if an entity corresponds to the slot labeling. Specific intent/slot combinations may also be tied to a particular source, which may then be used to resolve the text (such as by providing information or a command to be executed in response to a user query). Using the example, "play 'Video 1'," the source may be tied to a video catalog or the like. The output from Entity Resolution component may include a command, information, or other NLU result data indicating how the domain specific NLU processing handled the text and how the system should respond to the text, according to that specific domain.

In some embodiments, the multiple domains of NLU system 260 of FIG. 2B may operate substantially in parallel, with different domain specific components. That is, music domain 222 may have its own NER component 272-A, IC module 274-A, Slot Filler component 276-A, and Entity Resolution component 278-A. Video domain 224 may also have similar components, and so on for the different domains available to the system. The same text that is input into the NLU pipeline for Music Domain 222 may also be input into the NLU pipeline for Video Domain 224 (as well as additional domains), where the components for Music Domain 222 may operate on the text as if the text related to Music Domain 222, and so on for the different NLU pipelines for the different domains. Each domain specific NLU pipeline will create its own domain specific NLU results, for example Results A for Music Domain 222, Results B for Video Domain 224, Results C for Shopping Domain 226, and so on. Thus, if there are N domains, N-results may be obtained.

The different results may then be input into an initial domain ranking component 240, which may rank the different results for the different domains, and selects what the system believes to be the most applicable results given the input text and other factors. Those highest ranking results may then be used to execute a command, perform one or more actions, or obtain information responsive to a user query, or otherwise respond to the input text. In some embodiments, a list of hypotheses after all domains have completed named entity recognition and intent classification may be truncated, and the slot filling and entity resolution may occur on the un-truncated hypotheses. Reordering of the results may further be performed after the slot filling and entity resolution occurs. Persons of ordinary skill in the art will recognize that NLU system 260 may include any number of domains related to any particular subject, and the domains included in FIG. 2B (e.g., Music Domain 222, Video Domain 224, and Shopping Domain 226) are merely exemplary.

In some embodiments, the various results from the domains may be generated by determining a feature score associated with a particular intent hypothesis. For example, an intent hypothesis may correspond to a feature vector, where each "feature," or "value," may have a particular weight that is applied to it based on such the particular text query. For instance, the utterance "Play 'Song 1' by 'Artist 1'" might produce a result of: {Domain}: "Music," {Intent}: "Play Music," {Artist Name}: "Artist 1," {Media Type}: "Song," and {Song Name}: "Song 1." This result may be written into a feature vector formation where each attribute from NLU processing is one dimension of the feature. A dot product multiplication process may then be employed with a weighting vector where each weight may be, for example, 1 or 0 depending on the results of NLU processing. For example, "Artist Name" slot data representing the "Artist Name" slot being attributed "Artist 1" may cause the weight for this slot to be 1, whereas "Genre" slot data representing the "Genre" slot not being attributed a value may cause the weight for that slot to be 0. The result, as seen below by Equation 1, may be a feature score representing how accurately the particular intent hypothesis comports to the spoken utterance.

$$\begin{pmatrix} x_1 \\ x_2 \\ \vdots \\ x_n \end{pmatrix} \cdot (y_1 \quad y_2 \quad \ldots \quad y_n) = \sum_{i=1}^{n} x_i \cdot y_i = FeatureScore_1.$$

Equation 1

Each hypothesis may yield its own feature score—so for N domains, there may be N feature scores. The feature scores may then be ranked by initial domain ranking 240, where the greatest feature score is ranked first, while the smallest feature score is ranked last.

Such a multi-domain architecture results in narrowly defined intents and slots that are particular for each specific domain. This is due, in part, to the different models and components (such as the domain specific NER component, IC module, etc. and related models) being trained to operate only for the designated domain. Further, the separation of domains results in similar actions being represented separately across the domains even if there is overlap in the action. For example, "next song," "next book," and "next" may all be indicators of the same action, but will be defined differently in different domains due to domain specific processing restrictions. Further, domain agnostic queries that cross domains may be difficult to holistically respond to given the divisions between domains. For example, the query "get Title" may refer to a request to purchase a book, play a movie, or play a soundtrack, but the multi-domain architecture and approach of NLU system 260 of FIG. 2B may result in only one such action being performed with any acknowledgement of ambiguity as the "Title" can refer to a book, movie, or soundtrack (or possibly all three).

Persons of ordinary skill in the art will further recognize that, in one embodiment, text data representing a response may be generated by speech-processing system 200. For instance, NLU system 260 and/or functionalities system 262 may be employed to determine contextual features of a response to be generated, and may generate the corresponding text data representing that response. The text data may then be provided to TTS system 264, which may generate audio data representing the text data, which may then be sent to the requesting device.

In some embodiments, NLU system 260 may include contextual resolution system 270, which may be employed to assist in resolving certain entities based on contextual metadata associated with displayed content. For example, electronic device 100 may display a detail web page of an item available for purchase by an individual. The detail web page may include contextual metadata indicating various entities associated with the item such as, but not limited to, an item name—{Item Name}, an item identifier—{Item Identifier}, and the like. In some embodiments, the contextual metadata may also include an anaphoric term, {Anaphoric Term}. If the text of an utterance is, for example, "Buy this," then NLU system 260 may identify that the intent as being a purchasing intent having an entity resolution "Buy," and may also include an anaphoric term "this." Based on this information available from the text data, the purchasing domain may not be able to determine the specific action to perform because the entity "this" may not be able to be associated with a particular item. In this illustrative example, the contextual metadata may assist an application for resolving missing entities. Contextual resolution system 270 may determine which, if any, entities match between the contextual metadata and the declared slots for a particular domain. For example, the purchasing intent may include a slot for an item name, and the contextual metadata may also include a slot for item name having a particular value associated with it. After shopping domain 222 outputs data including any resolved entities, contextual resolution system 270 may append the contextual metadata including slot data representing the slot and the particular value associated with that slot to the output data. The output data may then be passed to the corresponding application identified by NLU system 260, and the application may use the output data including the selected context file to process the request. In one example, if a coffee maker having an item name "Coffee Maker" is displayed on display screen 212, then the contextual metadata may include contextual slot data for the entity {Item Name} having a value being "Coffee Maker." Furthermore, a unique identifier associated with the coffee maker having the item name "Coffee Maker" may be included for processing by shopping domain 222. Therefore, when shopping domain 222 outputs data to a shopping application, that output data may include contextual metadata indicating the unique identifier associated with the item.

As described previously, NLU system 260 may also include a feature extractor system 280, which may be configured to identify particular features for assisting in identifying a correct domain to facilitate an action associated with an utterance. Feature extractor system 280 may be capable of receiving one or more inputs, such as entity data 280A, presence data 280B, user history 280C, and current applications 280D, amongst other inputs. Furthermore, domain classifier 286 may also serve, in one embodiment, as an input to feature extractor 280. Each input may be capable of being used by domain re-ranker system 282 to re-rank the results of initial domain ranking 240. As mentioned previously, each intent hypothesis may include multiple "features," where an initial feature score that is calculated for a particular intent hypothesis is based, at least in part, on the text query generated from ASR processing, as well as NER system 272, IC system 274, Slot Filler 276, and Entity Resolution 278. Some features, such as whether or not content being rendered by electronic device 100 includes contextual entities matching one or more of the features identified by NLU processing, may be turned "off," or otherwise have a weighting of 0, during the initial feature score calculation. Thus, initial domain ranking 240 may not account for additional features—only those attributed during standard NLU processing.

Domain re-ranker 282 may cause the feature score calculation process to be performed again to account for features identified by feature extractor 280. For example, the presence of "Song Title" slot data representing a "Song Title" slot in content being rendered by electronic device 100 may cause a weighting for that feature to increase. As another example, an absence of one or more types of slot data for a particular intent within the rendered content may cause a weighting associated with those features to be decreased. Thus, domain re-ranker system 282 may take the input features from feature extractor system 280 and may generate new feature scores for each of the intent hypothesis determined by NLU processing. The new feature scores may then be provided to a re-ranked domain ranking 282, which may re-rank the results to account for the additional features obtained from feature extractor 280. Therefore, as an illustrative example, initial domain ranking 240 may have yielded a ranked domain listing where Result A from domain A is ranked first, followed by Result B, Result C, etc. After re-calculating the feature scores, re-ranked domain ranking 242 may yield a new ranked domain listing where Result B from domain B is ranked first, followed by Result A from domain A.

Figure 3:
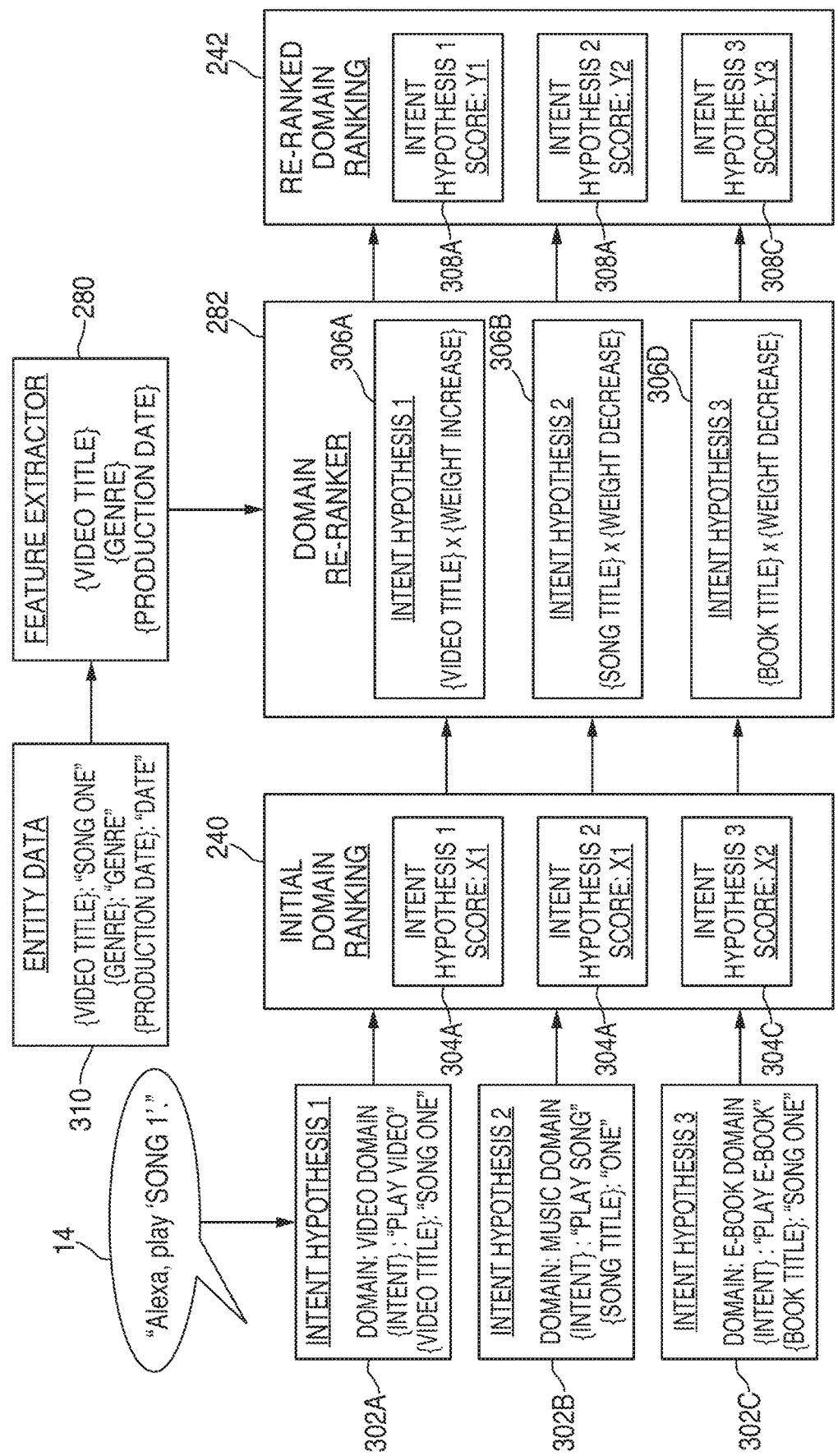
FIG. 3 is an illustrative diagram of an exemplary system describing how intent hypotheses may be ranked and then re-ranked using features extracted from entity data, in accordance with various embodiments.

FIG. 3 is an illustrative diagram of an exemplary system describing how intent hypotheses may be ranked and then re-ranked using features extracted from entity data, in accordance with various embodiments. In the illustrative embodiment, an utterance 14 may be spoken, and audio data representing utterance 14 may be received by a corresponding device (e.g., electronic device 100), and sent to speech-processing system 200. Upon receipt, speech-processing system 200, and in particular orchestrator 250, may provide ASR system 258 with the audio data. ASR system 258 may then, using STT system 266, generate text data representing the audio data. For instance, text strings representing each word of utterance 14 may be generated. After the text data is generated, orchestrator 250 may cause the text data to be provided to NLU system 260. Once the query text has been parsed and tagged using one or more grammar models, IC system 274 and NER system 272 may determine a likely intent, or intents, that utterance 14 is associated.

In one embodiment, utterance 14 may, upon performing NLU processing, be determined to correspond to three intent hypotheses—intent hypothesis 302A, intent hypothesis 302B, and intent hypothesis 302C. Intent hypothesis 302A may correspond to IC system 274 determining that the intent of utterance 14 may correspond to a video domain, such as video domain 224. In this particular scenario, the intent may be a "play video" intent, and the object "Song 1" may be attributed to the "Video Title" slot represented by "Video Title" slot data. Intent hypothesis 302B may correspond to IC system 274 determining that the intent of utterance 14 may correspond to a music domain, such as music domain 222. In this particular scenario, the intent may be a "play song" intent, and the object "Song 1" may be attributed to the "Song Title" slot represented by "Song Title" slot data. Furthermore, intent hypothesis 302C may correspond to IC system 274 determining that the intent of utterance 14 corresponds to an e-book domain. In this particular scenario, the intent may be a "play e-book" intent, and the object "Song 1" may be attributed to the "Book Title" slot represented by "Book Title" slot data. Persons of ordinary skill in the art will recognize that additional intent hypotheses may also be considered, and furthermore that multiple intent hypothesis associated with a same intent may also be considered. For example, one intent hypothesis may include the "play song" intent may have the object "Song 1" correspond to the "Song Title" slot, while another intent hypothesis may also include the "play song" intent where the object "Song 1" may alternatively correspond to an "Artist Name" slot.

Each of intent hypotheses 302A, 302B, and 302C may be used to calculate their own respective feature score, which may be provided to initial domain ranking 240, as described previously, and ranked. For example, in the illustrative embodiment, intent hypothesis 302A may have a feature score X1 and have ranking 304A, intent hypothesis 302B may also have a feature score X1 and having ranking 304B, and intent hypothesis 302C may have a feature score X2 and have ranking 304C, where X1 is greater than X2. This means that the initial ranking of the domains for intent hypotheses 302A, 302B, and 302C produces a ranked list where rankings 304A and 304B, corresponding to intent hypotheses 302A and 302B, are equal as they both correspond to the feature score X1, while ranking 304C, corresponding to intent hypothesis 302C, may be lower ranked as feature score X2 is less than feature score X1. However, persons of ordinary skill in the art will recognize that the initial ranked list may not include two or more intent hypotheses having a substantially same feature score, and the aforementioned is merely exemplary. For instance, domain re-ranking may, in some embodiments, be performed regardless of the initial ranking of intent hypotheses.

Utterance 14, as mentioned previously, may include the wakeword, "Alexa." In response to a device, such as electronic device 100, determining that the wakeword was uttered, it may also determine whether content is currently being rendered by that device's display screen (so long as the device includes a display screen). Similarly, a manual input causing the device to be activated such that it starts recording and sending audio data representing utterance 14 to speech-processing system 200 may also result in the device determining whether content is currently being rendered thereon. In some embodiments, notification data indicating that content is currently being displayed by the device while utterance 14 was spoken, or that no content is displayed, may be generated and sent to speech-processing system 200. The notification, for instance, may be a logical 1/0, or TRUE/FALSE indicator, whereby a logical 1 or TRUE may indicate that content is being displayed, whereas a logical 0 or FALSE may indicate that no content is being displayed.

Upon receiving the notification data, orchestrator 250 may send a request to the various domains associated with functionalities system 262. The request may inquire as to which domain/functionality is currently responsible for providing the content to electronic device 100. The responsible domain/functionality may generate and send entity data 310 to NLU system 260. Entity data 310 may include entity information indicating entity types of the entities included by the rendered content, as well as values associated with those entities. Each domain may be configured to format the rendered content to include slots with associated values that match with the various slots that NLU system 260 would identify for an intent associated with that domain. For example, a "Play Music" intent associated with music domain 222 may include slot data such as "Song Title" slot data, "Artist Name" slot data, and "Album Name" slot data, amongst others. Therefore, if music domain 222 is responsible for rendering content on display screen 222, the rendered content may be formatted to include some or all of the aforementioned types of slot data having values associated with them based on the specific content being provided. As an illustrative example, entity data 310 may include "Video Title" slot data representing a "Video Title" slot having a value "Song One," "Genre" slot data representing a "Genre" slot having a value "Genre," and "Production Date" slot data representing a "Production Date" slot having a value "Date." Video domain 224, which may have been responsible for rendering the content displayed by display screen 212, may generate and send entity data 310 to NLU system 260 in response to receiving the request from orchestrator 250.

Upon receiving entity data 260, feature extractor system 280 of NLU system 260 may "extract," or otherwise determine, what slots are included within entity data 310. For instance, feature extractor system 280 may determine that entity data 310 includes a "Video Title" slot, a "Genre" slot, and a "Production Date" slot. These three features may then be provided to domain re-ranker system 282 to re-calculate feature scores for each of intent hypotheses 302A, 302B, and 302C. In some embodiments, domain re-ranker system 282 may determine whether any of the slot data received from feature extractor system 280 are substantially equal to any of the slot data identified for a particular intent hypothesis. For instance, intent hypothesis 302A may include "Video Title" slot data, and entity data 310 may also include "Video Title" slot data. This may cause domain re-ranker system 282 to increase a weight applied to the "Video Title" slot to reflect the fact that the entity data also includes this slot. However, both of hypotheses 302B and 302C may not include any slot data matching those obtained from entity data 310. Thus, one or more of the slot types associated with the slot data, in some embodiments, may receive a decrease weight applied to them to reflect the fact that entity data 310 does not include that type of slot data.

In some embodiments, a first feature score calculation 306A by domain re-ranker system 282 may cause the "Video Title" slot data to receive an increased weight to its dimension in its corresponding weighting vector. For instance, as seen above with reference to Equation 1, each feature vector may be multiplied by a weight from a weighting vector having a same number of dimensions. Thus, because both intent hypothesis 302A and entity data 310 include "Video Title" slot data, the weight value for the "Video Title" slot's dimension within the weighting vector may receive an increase. Feature score calculations 306B and 306C, however, may cause a weight for certain slots of intent hypotheses 302B and 302C to be decreased as they both do not include any of the slots from entity data 310. However, persons of ordinary skill in the art will recognize that, in some embodiments, the lack, or absence, of certain types of slot data from entity data 310, as compared to the identified types of slot data of a particular intent hypothesis, may merely leave a weight vector static as opposed to decreasing the weighting applied to that feature, and the aforementioned is merely exemplary.

In some embodiments, features identified by feature extractor 280 that are otherwise not present within a feature vector calculated for a particular intent hypothesis during initial domain ranking 240 may cause that feature to be "turned on." For instance, a feature that has a zero weighting may be thought of, in one embodiment, as being "turned off." Therefore, if a feature identified from entity data 310 is now available but was previously not attributed a value during NLU processing, then this feature may receive a predefined weight increase in the corresponding weighting vector.

In some embodiments, a particular weight for a particular feature may be calculated offline using training data. This may allow for a determination to be made as to an effect that any particular feature may, or should, have to an intent hypothesis' overall feature score. In some embodiments, however, the weights may be calculated dynamically at run time based on a particular use case, or the weights may be determined for a particular user/device that a request was received from.

Feature score calculations 306A, 306B, and 306C may yield new feature scores Y1, Y2, and Y3, respectively. These feature scores may be provided to final domain ranking 242, which may generate a new ranked list of the intent hypotheses based on the new feature scores. As an illustrative example, ranking 308A, corresponding to intent hypothesis 302A, having feature score Y1, may now be ranked first, and therefore may be considered the most likely intent for utterance 13. Rankings 308B and 308C, corresponding to intent hypotheses 302B and 302C, respectively, and having feature scores Y2 and Y3, respectively, may now be ranked second and third, respectively. Therefore, intent hypothesis 302B, which initially was determined to be equally likely to be the intent of utterance 14 based on NLU processing, may now be determined to be less likely as being the intent of utterance 14 once entity data 310 was considered. Persons of ordinary skill in the art will recognize that domain re-ranker 282 need not be configured to re-rank intent hypotheses solely if initial domain ranking 240 yields two or more feature scores being substantially equal (e.g., within a predetermined range of values of one another). For instance, domain re-ranker 282, and feature extractor 280, may be configured to perform intent re-ranking regardless of the N-best list output by initial domain ranking 240.

Figure 4:
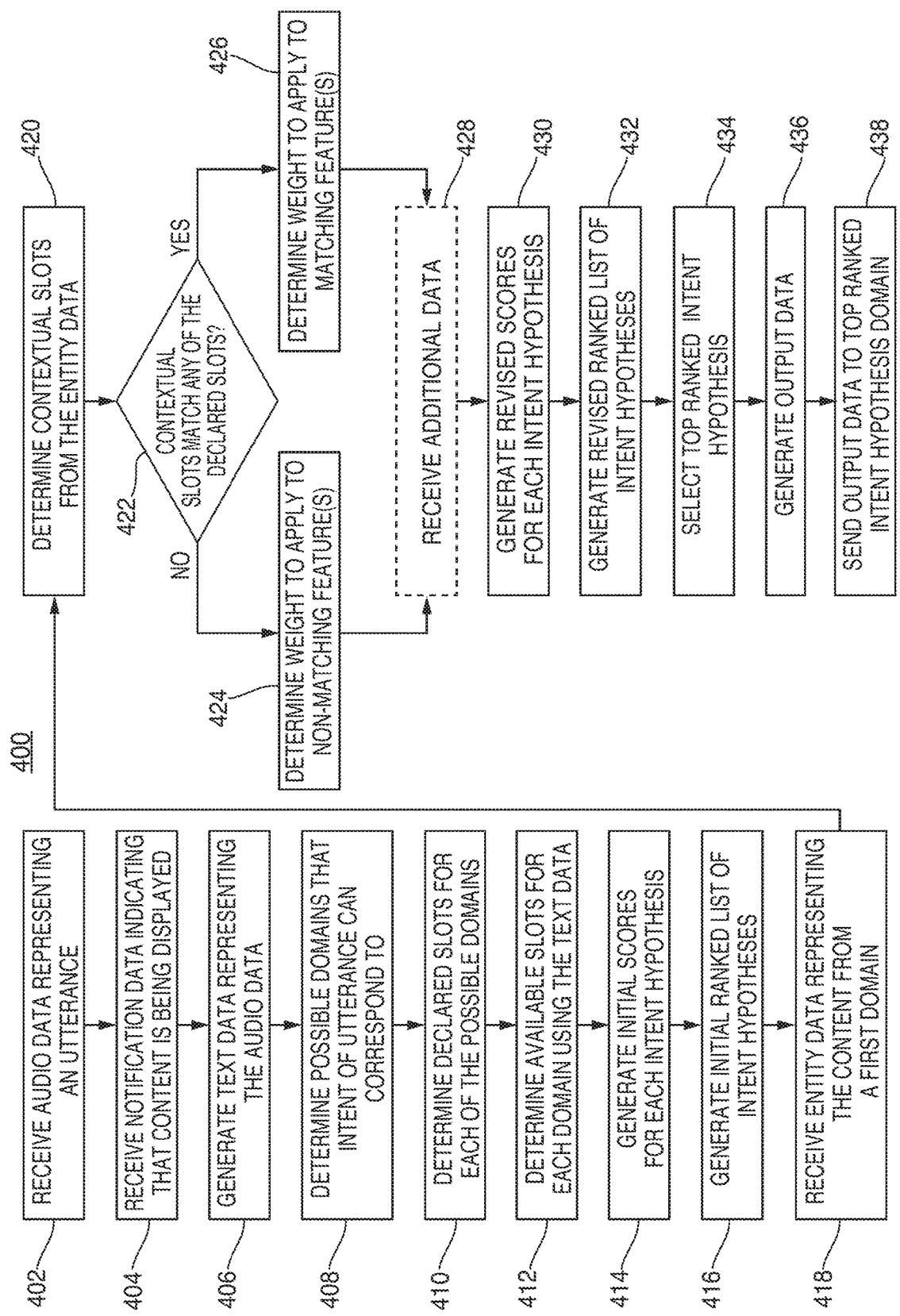
FIG. 4 is an illustrative flowchart of an exemplary process for determining an intent that an utterance is with associated by re-ranking intent hypotheses using entity data associated with content displayed on a display screen, in accordance with various embodiments.

FIG. 4 is an illustrative flowchart of an exemplary process for determining an intent that an utterance is associated with by re-ranking intent hypotheses using entity data associated with content displayed on a display screen, in accordance with various embodiments. Process 400, in a non-limiting embodiment, may begin at step 402. At step 402, audio data representing an utterance may be received by speech-processing system 200. For example, audio data representing utterance 4 from FIG. 1, or utterance 14 from FIG. 3, may be sent from electronic device 100 to speech-processing system 200 in response to electronic device 100 determining that a wakeword (e.g., "Alexa"), other trigger expression, and/or manual input, has been detected. At step 404, notification data indicating that content is being displayed by a display screen associated with electronic device 100 may be received by speech-processing system 200. In some embodiments, in response to the wakeword or other activation mechanism occurring, electronic device 100 and/or speech-processing system 200 may determine that content is being rendered by display screen 212 when the utterance was spoken. If so, then electronic device 100 may generate notification data (e.g., content metadata) that indicates that content is currently being displayed. The notification, which may be a logical 1/0, depending on whether content is being displayed or not, may then be sent to speech-processing system 200. At step 406, text data representing the audio data may be generated. For instance, upon receipt, orchestrator 250 may direct the audio data to ASR system 258.

At step 408, possible domains that an intent of the utterance can correspond to may be determined. After the text data has been generated, orchestrator 250 may cause the text data to be provided to NLU system 260. NLU system 260, as described in greater detail above, may parse and tag each word of the utterance using one or more grammar and/or language models. For instance, the utterance, "Play 'Video'," may be parsed into {Verb}: "Play," {Object}: "Video." Using the verb identified from the utterance, IC module 274 may attempt to identify an intent of the utterance. To do this, IC module 274 may look to gazetteer information associated with each domain of NLU system 260 to determine which domain(s) include that verb as being associated with a possible intent hypothesis that that particular domain is capable of servicing. So, as an illustrative example, the verb "play" may be included within gazetteer information for music domain 222, video domain 224, as well as an e-book domain. Therefore, in this particular example, the intent of the utterance (e.g., what action(s) an individual seeks to have occur) may be related to music domain 22, video domain 224, and the e-book domain. Each of these domains may be capable of facilitating requests prefaced by that verb and, depending on additional information associated with the particular utterance that was spoken and the text query representing that utterance, the particular domain may be determined.

At step 410, declared slots for each of the possible domains may be determined. The declared slots may correspond to various types of slot data representing slots associated with a particular intent. After identifying the intent, IC module 274 may obtain frameworks associated with each of those domains. The intents identified by IC system 274 may be linked to domain-specific grammar frameworks having data (e.g., slot data) representing "slots" or "fields" to be filled. Each slot or field may correspond may be of a particular slot type, and may correspond to a portion of the query text that the system believes corresponds to an entity. For example, if "play music" is an identified intent, a grammar framework or frameworks may correspond to sentence structures such as "Play {Artist Name}," "Play {Album Name}," "Play {Song name}," "Play {Song name} by {Artist Name}," etc. Therefore, for each intent hypothesis (the potential intent that the utterance may correspond to) may have its own particular grammar framework, and thus its own set of declared slots.

At step 412, available slots for each domain may be determined using the text data that has been generated. The available slots may correspond to some of the slot data that has been able to be attributed with a value based on the text data. For instance, as described above, slot filler 276 and entity resolution system 278 may attempt to assign a particular object/entity to each declared slot. The values that may be attributed to the slots may depend on the particular grammar and language models used by a particular domain to parse and tag the words, as well as each slot's type. For example, for the utterance, "Play video 1," the object "Video 1" may be assigned to "Song Title" slot data representing a "Song Title" slot for the "Play Music" intent. As another example, the object "Video 1" may be assigned to "Video Title" slot data representing a "Video Title" slot for the "Play Video" intent. A declared slot that has a value assigned to it may be referred to as an available slot. This means that there is some semantic representation of that declared slot based, in one embodiment, on the text query. Persons of ordinary skill in the art will further recognize that a single intent may yield multiple hypotheses. For instance, for the "play music" intent, a first intent hypothesis may have the object "Video" being assigned to the "Song Title" slot data, and a second intent hypothesis may have the object "Video" being assigned to the "Artist Name" slot data.

At step 414, initial scores for each intent hypothesis may be generated. In some embodiments, a vector (e.g., a feature vector) for a particular intent hypothesis may be determined, where each dimension of the vector corresponds to a particular feature of that intent hypothesis. For example, a "play music" intent may have a feature vector including a first feature for "Artist Name" slot data representing an "Artist Name" slot, a second feature for "Album Name" slot data representing an "Album Name" slot, and a third feature for "Song Title" slot data representing a "Song Title" slot. Generally speaking, a feature vector may include J-features, and while the aforementioned illustrative certain slots corresponding to features, additional characteristics may also be referred to as features such as, and without limitation, a feature for presence, a feature for device type (e.g., headless device, device with a screen), and the like. If a particular slot, for instance, has a value attributed to it based on the text query obtained from ASR processing, then that feature may be attributed a particular weight within a weighting vector. The weighting vector is of a same number of dimensions as the feature vector, as seen by Equation 1, and each weight is to be multiplied by a feature of the same dimensions. So, for example, the "Song Title" slot data may have been assigned a value of "Song 1" by NLU processing. Therefore, the weight for the "Song Name" slot data may be given a weight of "1," indicating that a value has been attributed to that feature. The feature vector and the weighting vector for each intent hypothesis may be multiplied (e.g., a vector dot product) and summed to generate the initial feature score.

At step 416, an initial ranked list of intent hypotheses may be generated. The initial ranked list, as identified by domain ranker 240, may rank the intent hypotheses based on their feature scores. For instance, an intent hypothesis having a feature score of X1 may be ranked greater than another intent hypothesis having a feature score of X2, where X1>X2. In some embodiments, two or more intent hypotheses may produce a same feature score. This may indicate, for example, that those intent hypotheses are each equally likely to represent the intent of the utterance based on the information available from the standard NLU processing. In some embodiments, two or more feature scores from the initial ranked list may be determined to be substantially equal to one another, however persons of ordinary skill in the art will recognize that this is merely exemplary.

At step 418, entity data representing the content being rendered by electronic device 100 at a time when the utterance was spoken may be received by NLU system 260 from a first domain. For instance, in response to receiving the notification at step 404, orchestrator 250 may poll the available domains to determine which one is responsible for providing the content to electronic device 100. After the domain identifies itself, the domain may generate and send entity data representing the content to NLU system 260, or to orchestrator 250 which may then send the entity data to NLU system 260.

At step 420, contextual slots from the entity data may be determined. The entity data may include contextual slot data representing contextual slots associated with rendered content. As previously discussed, the entity data may be formatted by each domain such that it includes contextual slot data representing contextual slots, and values associated with those contextual slots. The contextual slots may be substantially similar to the declared slots that NLU processing identifies for an intent associated with that domain. For example, the "play music" intent may include "Song Title" slot data representing a "Song Title" slot, "Artist Name" slot data representing an "Artist Name" slot, and "Album Name" slot data representing an "Album Name" slot, amongst others. If the music domain is responsible for displaying a detailed web page including a song to be played, then the entity data may include contextual slot data representing contextual slots. For example, the entity data may include "Song Title" slot data, "Artist Name" slot data, and "Album Name" slot data. Therefore, the naming conventions for the slot data associated with the contextual slots of the entity data and the slot data associated with the declared slots from NLU processing, may be substantially similar. However, persons of ordinary skill in the art will recognize that the naming conventions may differ, and a mapping may also be included that maps a contextual slot to a corresponding declared slot may be employed. In some embodiments, feature extractor system 280 may be configured to identify the types of contextual slot data included within the entity data and may take those types of contextual slots and compare them against the available slots, as well as the remaining declared slots, from NLU processing.

At step 422, a determination may be made as to whether any of the contextual slots match any of the declared slots. For instance, a determination may be made as to whether any slot data from the initial NLU processing substantially the same as the slot data obtained from the entity data. So, continuing the above example, if one of the contextual slots corresponds to "Song Title" slot data, and a particular intent hypothesis includes "Song Title" slot data, then this may indicate that there is a match. Thus, if there are one or more matches identified at step 422, process 400 may proceed to step 426. However, if it is determined that no contextual slots match any of the declared slots, then process 400 may proceed to step 424.

At steps 424 and 426, weights to apply to the non-matching and/or matching feature(s) may be determined. The weightings may, in some embodiments, be predefined using training data to indicate a magnitude that a particular feature is to be assigned. In some embodiments, the weight to be applied to a non-matching feature may be negative or zero such that that particular feature brings down that intent hypothesis' feature score. Conversely, the weight to be applied to a matching feature may be unity or any other positive value such that that particular feature boosts, or increases, that intent hypothesis' feature score. Persons of ordinary skill in the art will recognize that although a single decision is made at step 422, each intent hypothesis may include multiple contextual slots and declared slots that match as well as not match. Therefore, in some embodiments, for even a single intent hypothesis, process 400 may proceed to both steps 424 and 426, and weights may be applied to non-matching features as well as matching features associated with that particular intent hypothesis.

At step 428, additional data associated with electronic device 100 may also be received. For example, presence data, user history information, information regarding additional applications running on electronic device 100, and/or user preferences, may also be received by NLU system 260, and in particular, by feature extractor system 280. The additional data may be employed by feature extractor system 280 to obtain additional features that may be applicable to the intent resolution for the utterance that was spoken. For example, presence data may assist in determining whether the intent is for a video to be played or for music to be played based on whether or not an individual is currently located nearby electronic device 100. Furthermore, if one or more additional applications are also running, then the intent of the utterance may relate to that application, and therefore may be weighted accordingly. In some embodiments, step 428 may be optional in that additional data may not always be received.

At step 430, revised feature scores for each intent hypothesis may be generated. The feature scores may be calculated in a substantially similar way as to that of step 414, with the exception that the revised feature score may encompass the modified or additional weighting applied to the features associated with the matching slots identified from the entity data. At step 432, a revised ranked list of intent hypotheses may be generated based on the revised feature scores. Step 432 and step 416 may be substantially similar to one other with the exception that at step 432 the revised ranking is based on the revised feature scores.

Figure 5:
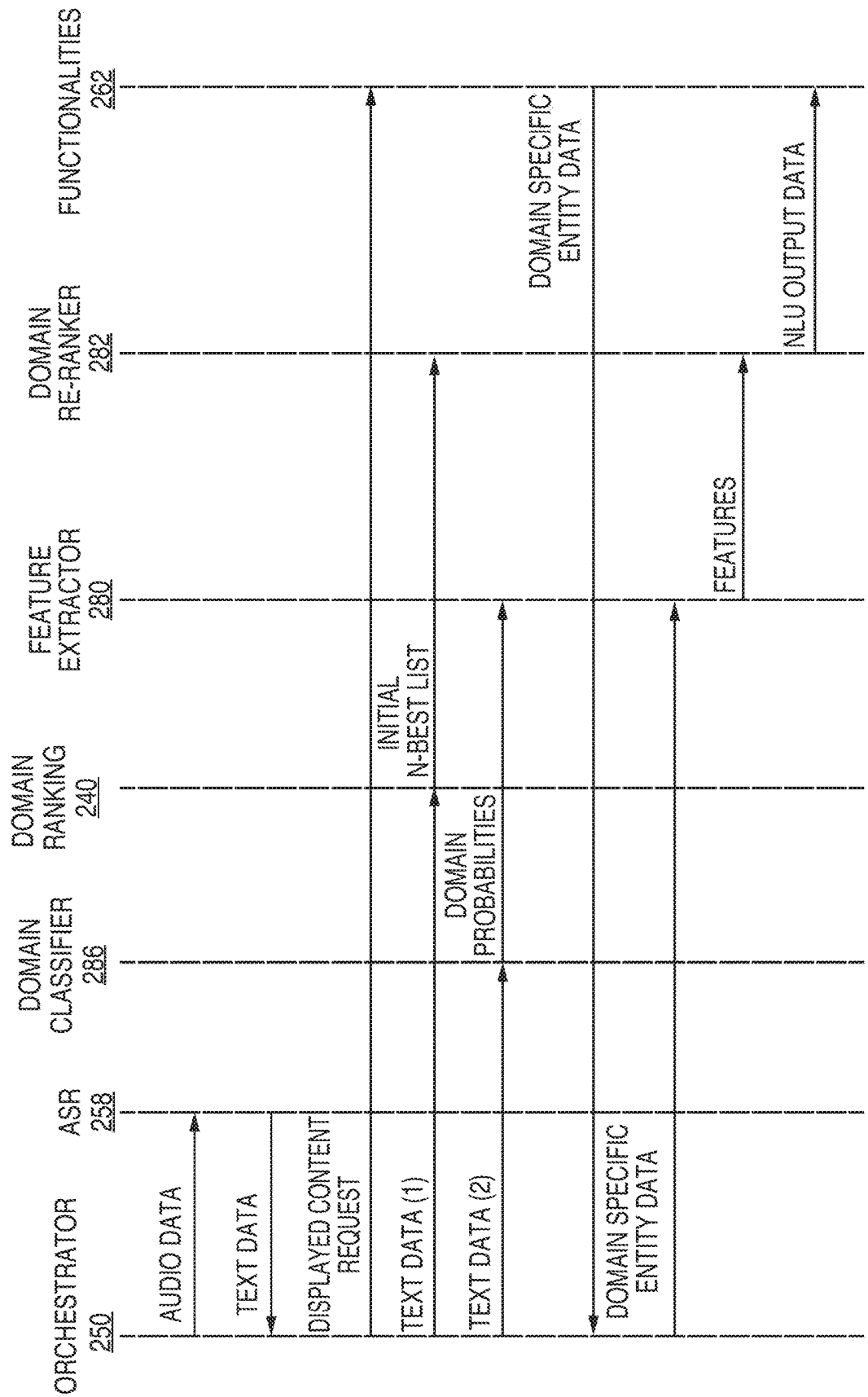
FIG. 5 is an illustrative diagram of an exemplary process describing how an orchestrator facilitates domain re-ranking for intent hypotheses using entity data, in accordance with various embodiments.

At step 434, the top ranked intent hypothesis may be selected as the determined intent for the utterance. For example, if the top ranked intent hypothesis is a "Play Video" intent, then the utterance may be determined to correspond to an intent to play a video. At step 436, output data may be generated by NLU system 260. The output data may include the entity data and the selected intent hypothesis including the various slots and values attributed to those slots as determined by NLU processing. In some embodiments, a selected context output file may also be generated that includes the entity data/contextual metadata representing the content displayed by display screen 212. At step 438, the output data may be sent to the top ranked intent hypothesis' corresponding domain. For example, if the "play video" intent is the top ranked hypothesis based on the revised feature scores, then the output data may be sent to video domain 224. Persons of ordinary skill in the art will recognize that the re-ranking process may occur regardless of whether the initial ranking include two or more intent FIG. 5 is an illustrative diagram of an exemplary process describing how an orchestrator facilitates domain re-ranking for intent hypotheses using entity data, in accordance with various embodiments. In the non-limiting embodiment, audio data received by speech-processing system 200 may first be provided to orchestrator 250. Orchestrator 250, upon receipt, may provide the audio data to ASR system 258. ASR system 258 may generate text data representing the audio data and may send the text data back to orchestrator 250. At a substantially same time as the audio data being received, orchestrator 250 may also receive a notification from the requesting device (e.g., the device that sent the audio data) that indicates that the requesting device is currently displaying content. For example, electronic device 100 may generate a notification indicating that content is being rendered by display screen 212. In response, orchestrator 250 may generate a display content request and may send the display content request to functionalities system 262. The display content request may inquire to the corresponding domains/functionalities associated with speech-processing system 200 as to which one is responsible for providing the rendered content to electronic device 100.

As the inquiry is being made to functionalities system 262, orchestrator 250 may send the text data that was generated, or otherwise cause the text data to be sent, to domain NLU system 260. NLU system 260 may, as mentioned above, perform named entity recognition processing, intent classification processing, slot filling processing, and entity resolution processing to the text data, and may determine one or more initial intent hypotheses for the utterance. The various intent hypotheses may be provided to domain classifier 286 to generate initial results for the intent hypotheses. In some embodiments, the text data may be duplicated into a first copy of the text data and a second copy of the text data. For instance, the first copy of the text data may be used by domain ranking 240 to generate an initial N-best list of intent hypotheses using the initial results. The initial N-best list results may then be provided to domain re-ranker 282 for use in performing domain re-ranking. The second copy of the text data may be provided, substantially in parallel to NER processing, IC processing, slot filler processing, and entity resolution processing being performed, to domain classifier 286. Domain classifier 286 may output domain probabilities indicating a likelihood that the utterance (e.g., utterance 4) corresponds to a particular domain. The domain probabilities may then be provided to feature extractor 280.

After identifying the domain/functionality responsible for providing the rendered content, that domain/functionality may send the domain specific entity data representing the content to orchestrator 250, which in turn may provide the entity data to feature extractor system 280. In some embodiments, however, the entity data may be provided directly to feature extractor system 280. Feature extractor system 280 may determine the various features associated with the entity data, including which contextual slots from the entity data are also represented by one or more of the initial intent hypotheses.

Feature extractor 280 may, using the entity data and the domain probabilities obtained from domain classifier 286, extractor features associated with the utterance and the requesting device. The "features" which are extracted by feature extractor 280 may be provided to domain re-ranker 282 to re-rank the intent hypotheses by recalculating the feature scores for each intent hypothesis. The revised feature scores may then be used to re-rank the intent hypothesis to encompass the information associated with the rendered content. Domain re-ranker 282 may then generate the final N-best list of intent hypotheses, and a selection of the top ranked intent hypothesis may occur. Using the selected intent hypothesis' framework, as well as values attributed to the framework, output data from NLU system 260 may be generated, and the output data along with contextual metadata representing the features may be sent to the corresponding domain of functionalities system 262 that the selected intent hypothesis corresponds to. The output data, in one embodiment, may include the selected intent hypothesis, entities attributed to the various slots associated with that intent hypothesis, and the entity data.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A computer-implemented method, comprising:
   receiving first data representing a first instance of a first natural language input;
   determining first user history data corresponding to the first instance of the first natural language input;
   using the first data and the first user history data to determine first output data representing the first instance of the first natural language input;
   receiving second data representing a second instance of the first natural language input;
   determining second user history data corresponding to the second instance of the first natural language input, the second user history data being different from the first user history data; and
   using the second data and the second user history data to determine second output data representing the second instance of the first natural language input, wherein the second output data is different from the first output data.

2. A computer-implemented method, comprising:
   receiving first data representing a first instance of a first natural language input;
   determining first context data corresponding to the first instance of the first natural language input, the first context data representing first content being displayed on a device associated with the first instance;
   using the first data and the first context data to determine first output data representing the first instance of the first natural language input;
   receiving second data representing a second instance of the first natural language input;
   determining second context data corresponding to the second instance of the first natural language input, the second context data representing second content being displayed on a device associated with the second instance, the second content different from the first content; and using the second data and the second context data to determine second output data representing the second instance of the first natural language input, wherein the second output data is different from the first output data.

3. A computer-implemented method, comprising:

receiving first data representing a first instance of a first natural language input;

determining first presence data corresponding to the first instance of the first natural language input;

using the first data and the first presence data to determine first output data representing the first instance of the first natural language input;

receiving second data representing a second instance of the first natural language input;

determining second presence data corresponding to the second instance of the first natural language input; and using the second data and the second presence data to determine second output data representing the second instance of the first natural language input, wherein the second output data is different from the first output data.

4. The computer-implemented method of claim 1, further comprising:

determining first NLU results data potentially corresponding to the first instance;

determining second NLU results data potentially corresponding to the first instance;

processing the first NLU results data, the second NLU results data, and the first user history data to determine the first NLU results data more closely corresponds to the first instance than the second NLU results data;

causing the first output data to be determined using the first NLU results data;

determining the first NLU results data potentially correspond to the second instance;

determining the second NLU results data potentially correspond to the second instance;

processing the first NLU results data, the second NLU results data, and the second user history data to determine the second NLU results data more closely corresponds to the second instance than the first NLU results data; and causing the second output data to be determined using the second NLU results data.

5. The computer-implemented method of claim 2, further comprising:

determining first NLU results data potentially corresponding to the first instance;

determining second NLU results data potentially corresponding to the first instance;

determining the first NLU results data are ranked higher than the second NLU results data;

determining no user history data is available for the first instance;

causing the first output data to be determined using the first NLU results data;

determining the first NLU results data potentially correspond to the second instance;

determining the second NLU results data potentially correspond to the second instance;

determining first user history data corresponding to the second instance;

processing the first NLU results data, the second NLU results data, and the first user history data to determine the second NLU results data more closely corresponds to the second instance than the first NLU results data; and causing the second output data to be determined using the second NLU results data.

6. The computer-implemented method of claim 1, further comprising:

determining the first instance corresponds to a first device; and determining the second instance corresponds to the first device.

7. The computer-implemented method of claim 1, further comprising:

determining a first feature vector corresponding to the first user history data;

processing the first feature vector using a first model to determine the first output data;

determining a second feature vector corresponding to the second user history data; and processing the second feature vector using the first model to determine the second output data.

8. A system comprising:

at least one processor; and at least one memory comprising instructions that, when executed by the at least one processor, cause the system to:

receive first data representing a first instance of a first natural language input;

determine first context data corresponding to the first instance of the first natural language input, the first context data representing a first application associated with the first instance;

use the first data and the first context data to determine first output data representing the first instance of the first natural language input;

receive second data representing a second instance of the first natural language input;

determine second context data corresponding to the second instance of the first natural language input, the second context data representing a second application associated with the second instance, the second application different from the first application; and use the second data and the second context data to determine second output data representing the second instance of the first natural language input, wherein the second output data is different from the first output data.

9. A system comprising:

at least one processor; and at least one memory comprising instructions that, when executed by the at least one processor, cause the system to:

receive first data representing a first instance of a first natural language input;

determine first context data corresponding to the first instance of the first natural language input, the first context data representing a first device type associated with the first instance;

use the first data and the first context data to determine first output data representing the first instance of the first natural language input;

receive second data representing a second instance of the first natural language input;

determine second context data corresponding to the second instance of the first natural language input, the second context data representing a second device type associated with the second instance, the second device type different from the first device type; and use the second data and the second context data to determine second output data representing the second instance of the first natural language input, wherein the second output data is different from the first output data.

10. The system of claim 8, wherein the at least one memory further comprises instructions that, when executed by the at least one processor, further cause the system to:
  determine first NLU results data potentially corresponding to the first instance;
  determine second NLU results data potentially corresponding to the first instance;
  process the first NLU results data, the second NLU results data, and the first context data to determine the first NLU results data more closely corresponds to the first instance than the second NLU results data;
  cause the first output data to be determined using the first NLU results data;
  determine the first NLU results data potentially correspond to the second instance;
  determine the second NLU results data potentially correspond to the second instance;
  process the first NLU results data, the second NLU results data, and the second context data to determine the second NLU results data more closely corresponds to the second instance than the first NLU results data; and
  cause the second output data to be determined using the second NLU results data.

11. The system of claim 8, wherein the at least one memory further comprises instructions that, when executed by the at least one processor, further cause the system to:
  determine first NLU results data potentially corresponding to the first instance;
  determine second NLU results data potentially corresponding to the first instance;
  determine the first NLU results data are ranked higher than the second NLU results data;
  determine no user history data is available for the first instance;
  cause the first output data to be determined using the first NLU results data;
  determine the first NLU results data potentially correspond to the second instance;
  determine the second NLU results data potentially correspond to the second instance;
  determine first user history data corresponding to the first instance;
  process the first NLU results data, the second NLU results data, and the first user history data to determine the second NLU results data more closely corresponds to the second instance than the first NLU results data; and
  cause the second output data to be determined using the second NLU results data.

12. The system of claim 8, wherein the at least one memory further comprises instructions that, when executed by the at least one processor, further cause the system to:
  determine the first instance corresponds to a first device; and
  determine the second instance corresponds to the first device.

13. The system of claim 8, wherein the at least one memory further comprises instructions that, when executed by the at least one processor, further cause the system to:
  determine a first feature vector corresponding to the first context data;
  process the first feature vector using a first model to determine the first output data;
  determine a second feature vector corresponding to the second context data; and
  process the second feature vector using the first model to determine the second output data.

14. The computer-implemented method of claim 2, further comprising:
  determining the first instance corresponds to a first device; and
  determining the second instance corresponds to the first device.

15. The computer-implemented method of claim 2, further comprising:
  determining a first feature vector corresponding to the first context data;
  processing the first feature vector using a first model to determine the first output data;
  determining a second feature vector corresponding to the second context data; and
  processing the second feature vector using the first model to determine the second output data.

16. The computer-implemented method of claim 3, further comprising:
  determining the first instance corresponds to a first device; and
  determining the second instance corresponds to the first device.

17. The computer-implemented method of claim 3, further comprising:
  determining a first feature vector corresponding to the first presence data;
  processing the first feature vector using a first model to determine the first output data;
  determining a second feature vector corresponding to the second presence data; and
  processing the second feature vector using the first model to determine the second output data.

18. The system of claim 9, wherein the at least one memory further comprises instructions that, when executed by the at least one processor, further cause the system to:
  determine the first instance corresponds to a first device; and
  determine the second instance corresponds to the first device.

19. The system of claim 9, wherein the at least one memory further comprises instructions that, when executed by the at least one processor, further cause the system to:
  determine a first feature vector corresponding to the first context data;
  process the first feature vector using a first model to determine the first output data;
  determine a second feature vector corresponding to the second context data; and
  process the second feature vector using the first model to determine the second output data.

* * * * *